US007496647B2

(12) United States Patent
Karaoguz et al.

(10) Patent No.: US 7,496,647 B2
(45) Date of Patent: Feb. 24, 2009

(54) PERSONAL INTER-HOME MEDIA EXCHANGE NETWORK

(75) Inventors: Jeyhan Karaoguz, Irvine, CA (US); James D. Bennett, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 672 days.

(21) Appl. No.: 10/657,390

(22) Filed: Sep. 8, 2003

(65) Prior Publication Data

US 2004/0117845 A1 Jun. 17, 2004

Related U.S. Application Data

(60) Provisional application No. 60/469,182, filed on May 9, 2003, provisional application No. 60/469,329, filed on May 9, 2003, provisional application No. 60/443,894, filed on Jan. 30, 2003, provisional application No. 60/432,472, filed on Dec. 11, 2002.

(51) Int. Cl.
*G06F 15/173* (2006.01)
(52) U.S. Cl. .................. 709/223; 709/212; 709/217; 709/219; 709/226; 709/230; 725/86; 725/91; 725/100; 725/103; 348/207.1
(58) Field of Classification Search ............ 709/219, 709/223, 226, 212, 217, 230; 725/9–98, 725/100, 103; 348/207.1
See application file for complete search history.

(56) References Cited

U.S. PATENT DOCUMENTS 5,721,815 A * 2/1998 Ottesen et al. ............. 715/721

| | | | |
|---|---|---|---|
| 5,721,878 A * | 2/1998 | Ottesen et al. | 725/87 |
| 5,930,493 A * | 7/1999 | Ottesen et al. | 725/92 |
| 6,233,428 B1 | 5/2001 | Fryer | |
| 6,349,324 B1 * | 2/2002 | Tokoro | 709/200 |
| 6,480,889 B1 * | 11/2002 | Saito et al. | 709/220 |
| 6,693,896 B1 * | 2/2004 | Utsumi et al. | 370/352 |
| 7,003,795 B2 | 2/2006 | Allen | |
| 7,055,104 B1 * | 5/2006 | Billmaier et al. | 715/765 |
| 7,065,778 B1 * | 6/2006 | Lu | 725/98 |
| 7,080,400 B1 * | 7/2006 | Navar | 725/139 |
| 7,234,117 B2 * | 6/2007 | Zaner et al. | 715/758 |
| 2002/0016971 A1 | 2/2002 | Berezowski | |
| 2003/0004916 A1 * | 1/2003 | Lewis | 707/1 |
| 2003/0078968 A1 * | 4/2003 | Needham et al. | 709/204 |
| 2003/0115585 A1 | 6/2003 | Barsness | |
| 2004/0003040 A1 | 1/2004 | Beavers | |
| 2004/0243671 A9 * | 12/2004 | Needham et al. | 709/204 |
| 2007/0174886 A1 * | 7/2007 | Scheuer et al. | 725/110 |
| 2007/0198738 A1 * | 8/2007 | Angiolillo et al. | 709/231 |

FOREIGN PATENT DOCUMENTS

| WO | WO 0119084 A1 | 3/2001 |
|---|---|---|
| WO | WO 0146818 A1 | 6/2001 |
| WO | WO 0230116 A1 | 4/2002 |

OTHER PUBLICATIONS

Tokmakoff A et al, "Home Media Server Content Management", proceedings of the Spie, Spie, Bellingham, VA, US vol. 4519, Aug. 22, 2001, pp. 168-179, XP009017768, ISSN: 02770786X.

* cited by examiner

*Primary Examiner*—Liangche A Wang
(74) *Attorney, Agent, or Firm*—McAndrews, Held & Malloy, Ltd.

(57) ABSTRACT

A system and method support the exchange of media between friends, family members, and 3$^{rd}$ party media providers over a closed and secure media exchange network. The media may include, for example, digital video, digital audio, digital images, digital data, or any form of digital information.

31 Claims, 14 Drawing Sheets

PERSONAL INTER-HOME MEDIA EXCHANGE NETWORK

CROSS-REFERENCE TO RELATED APPLICATIONS/INCORPORATION BY REFERENCE

This application makes reference to, claims priority to and claims benefit from U.S. Provisional Patent Application Serial No. 60/432,472 filed on Dec. 11, 2002, U.S. Provisional Patent Application Serial No. 60/443,894 filed on Jan. 30, 2003, U.S. Provisional Patent Application Serial No. 60/469,329 filed on May 9, 2003, and U.S. Provisional Patent Application Serial No. 60/469,182 filed on May 9, 2003. In addition, the complete subject matter of the above patent applications are hereby incorporated herein by reference, in their entirety.

FEDERALLY SPONSORED RESEARCH OR DEVELOPMENT

Not Applicable

SEQUENCE LISTING

Not Applicable

MICROFICHE/COPYRIGHT REFERENCE

Not Applicable

BACKGROUND OF THE INVENTION

Today, people have many digital media devices and media types available to them, such as digital cameras providing still pictures, DVD's and digital camcorders providing moving video, CD's and MP3 players providing audio, etc. Different software is required to deliver the different media using a personal computer (PC). Also, the user interfaces for the different media types are also different from each other. If, for example, a son wants to send digital pictures from his digital camera to his mother, she would need to have a PC, he would have to send the pictures via e-mail, and she would have to be e-mail savvy. The mother would also need the correct software to view the pictures. The son may have to talk his mother through the process of how to view the pictures on her PC. The pictures just exist in a large e-mail file and may be lost if the mother or son upgrades their PC by, for example, changing operating systems.

Also, if the son wants to show the pictures to people at his home, he would need to have everyone gather around his PC, which does not provide for a good sharing experience.

Also, certain types of sales and advertisement media and new music media are typically available from just a PC environment and are not accessible by a television. Currently, television provides mostly fixed media and not much interactivity as a PC and Internet environment may provide. A television viewer is essentially limited to watching fixed media including the same commercials that everyone else is watching.

Media devices may be battery powered, portable or mobile devices that are designed to operate while in motion ("roaming media devices"), or may be designed for operation while in a fixed location and usually connected to a power outlet ("stationary media devices"). Typical media devices, including media capture and player devices such as video and image cameras, audio recorders, and video, audio and image players, are designed for direct user control.

Direct control of such media devices occurs manually through buttons, switches and keypads on the media device or on an associated remote control device. With direct control, users have access to a wide set of device commands, such as power on or off, play, rewind, capture, erase, delete, zoom, rewind, skip, sleep, standby, volume, brightness, modes, scan, etc. Direct access to media (for playback, review, etc.) in typical media devices is but one result of direct control.

Many of such media devices also use displays, light emitting diodes, and other visual components to assist the user in carrying out direct control. Audible or audio components are also often employed to assist.

Most media devices offer no means for indirect control, and, for those that do, the indirect control is very limited and difficult to use. Indirect control is control that is initiated from an independent device that may or may not be operated by a user. Independent devices do not include remote control devices that communicate directly with the media device (associated remote control devices).

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various embodiments of the present invention provide a system and method to perform exchanges of media between friends, family members, and $3^{rd}$ party media providers over a closed, secure media exchange network. The media may include, for example, digital video, digital audio, digital images, digital data, or any form of digital information.

Aspects of the present invention may be found in a system supporting exchange of media. Such a system may comprise a first television display in a first home, and a first storage in the first home that stores the media. The first storage may support consumption of the media by the first television display in the first home, and may have an associated first network address. The system may also comprise a second television display in a second home, and a second storage supporting consumption of the media by the second television display in the second home, the second storage having an associated second network address.

An embodiment of the present invention may also comprise a communication network and server software. The server software may receive a request that identifies one of the associated first and second network addresses, and may respond by identifying the other of the associated first and second network addresses. The server software may support delivery via the communication network of the media from the first storage to the second home for consumption by the second television display. The first and second network addresses may be one of an Internet protocol (IP) address, a media access control (MAC) address, and an electronic serial number (ESN). The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. The communication network may be the Internet, and the media may comprise at least one of audio, a still image, video, and data, and the media may also comprise real-time video. The consumption may comprise at least one of playing audio, displaying a still image, displaying video, and displaying data.

Further aspects of the present invention may be seen in a system supporting exchange of media. An embodiment of such a system may comprise a first storage in a first home that stores the media, and having an associated first protocol address. The system may also comprise a second television display in a second home, and having an associated second protocol address. The system may also comprise set top box circuitry, in the first home. The set top box circuitry may be communicatively coupled to deliver the media from the first storage to the second television display for consumption. An embodiment of the present invention may also comprise a communication network, and server software that receives a request that identifies one of the associated first and second protocol addresses. The server software may respond by identifying the other of the associated first and second protocol addresses to support delivery via the communication network of the media from the first storage to the second television display for consumption. The media in an embodiment of the present invention may comprise at least one of audio, a still image, video, and data, and the media may comprise real-time video.

In an embodiment of the present invention, the first and second protocol addresses may be one of an Internet protocol (IP) address, a media access control (MAC) address, and an electronic serial number (ESN). The consumption may comprise at least one of playing audio, displaying a still image, displaying video, and displaying data. The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. In an embodiment in accordance with the present invention, the communication network may be the Internet. The server software may support anonymous media exchange, and may forward media from the first storage to the second television display. In an embodiment of the present invention, the server software may be at a location separate from the first home and the second home.

Additional aspects of the present invention may be observed in a system supporting exchange of media, where the system comprises a first storage in a first home that stores the media, and a second television display in a second home. The system may also comprise set top box circuitry, in the first home, communicatively coupled to deliver the media from the first storage to the second television display for consumption. In addition, the system may comprise a communication network, and server software that coordinates delivery of the media from the first storage to the set top box circuitry.

In an embodiment of the present invention, the media may comprise at least one of audio, a still image, video, and data, and the media may comprise real-time video. Consumption in an embodiment in accordance with the present invention may comprise at least one of playing audio, displaying a still image, displaying video, and displaying data. The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. The communication network may be the Internet. In an embodiment of the present invention, the server software may support anonymous media exchange.

These and other advantages, aspects and novel features of the present invention, as well as details of an illustrated embodiment thereof, will be more fully understood from the following description and drawings.

DETAILED DESCRIPTION OF THE INVENTION

Certain embodiments of the present invention relate to the field of media exchange and sharing. More specifically, certain embodiments of the present invention relate to the exchange and sharing of media between, for example, family members and friends in an efficient, user-friendly, and economically viable manner over a closed and secure media exchange network. Digital media may be pushed from one user to another over a media exchange network, or pulled from one location to another over a media exchange network, in accordance with various embodiments of the present invention. Sources of media on a media exchange network may include any digital storage devices including servers, PC's, MPS's (media processing systems), media storage servers (e.g., NAS (network attached storage) units), and media peripheral devices. In accordance with an embodiment of the present invention, a media peripheral device comprises a computer running media capture software and/or media player software and having functionality that is coordinated through, for example, a TV screen.

Figure 1:
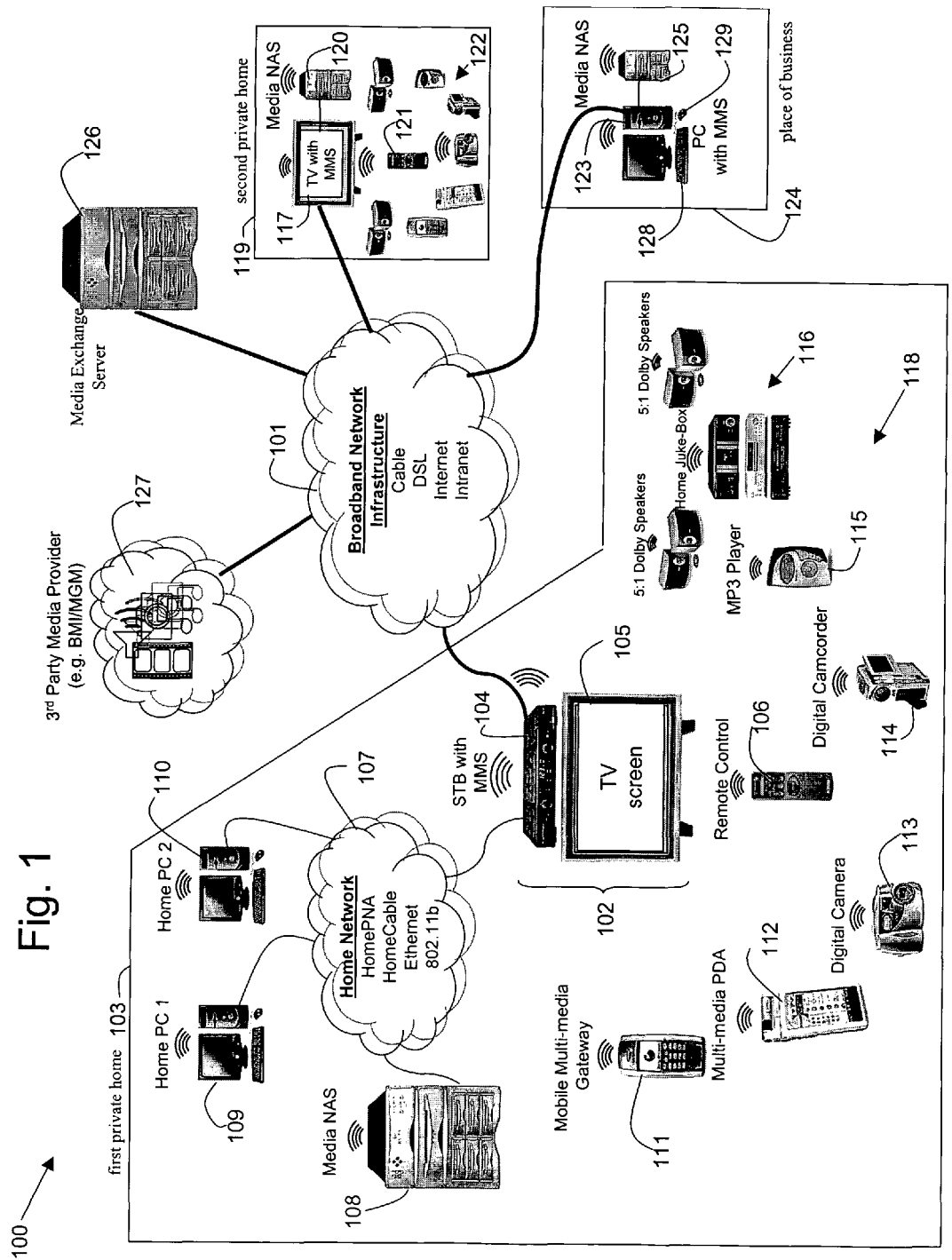
FIG. 1 is a diagram illustrating an embodiment of a media exchange network supporting the exchange of media, in accordance with various aspects of the present invention.

FIG. 1 is a diagram illustrating an embodiment of a media exchange network 100 supporting the exchange of media, in accordance with various aspects of the present invention. The various types of media may include, for example, digital video, digital audio, digital images, digital data, and any other type of digital information. In accordance with an embodiment of the present invention, media is stored in the form of digital files (e.g., a MP3 file, a MPEG 2 file, etc.). Specifically, a media exchange network 100 is a communication network comprising, for example, a broadband network infrastructure 101, a first MPS 102 in a first private home 103 comprising a STB (set-top-box) 104 incorporating a MMS (media management system) also known as a MES (media exchange software) platform, and a TV screen 105. The functionality provided by the MMS in the STB 104 is controlled by a remote control 106. The media exchange network 100 further comprises a home network 107, a media NAS (network attached storage) unit 108, a first home PC 109, and a second home PC 110 all in the first private home 103. The media exchange network also comprises a plurality of media peripheral devices 118 including a mobile multi-media gateway 111, a multi-media PDA 112, a digital camera 113, a digital camcorder 114, a MP3 player 115, and a home juke-box 116 all in the first private home 103. In accordance with an embodiment of the present invention, a media peripheral device may also comprise a PC.

The media exchange network 100 further comprises an MPS 117 comprising a TV incorporating a MMS at a second private home 119. The functionality provided by the MMS in the MPS 117 is controlled by a remote control 121. The media exchange network also comprises a media NAS unit 120 and a plurality of media peripheral devices 122 at the second private home 119. The media exchange network 100 further comprises an MPS 123 including a PC incorporating a MMS at a place of business 124. A PC-based MPS such as MPS 123 may be equipped with a television tuner card to permit MPS 123 to access over-the-air broadcast media. The functionality provided by the MMS in the MPS 123 is controlled by a keyboard 128 and/or a mouse 129. The media exchange network 100 also includes a media NAS unit 125 at the place of business 124. Finally, the media exchange network 100 comprises a media exchange server 126 and a $3^{rd}$ party media provider 127 (or $3^{rd}$ party service provider).

The MPS 102, the MPS 117, the MPS 123, the media exchange server 126, and the $3^{rd}$ party media provider 127 all interface to the broadband network infrastructure 101. The STB 104 interfaces via a wired or wireless connection to the TV screen 105 forming the MPS 102 at the first private home 103. The MPS 102 connects to the home network 107 via a wired or wireless connection. The media NAS unit 108, the first PC 109, and the second PC 110 each interface to the home network 107 as well, via a wired or wireless connection. Each media peripheral device in the plurality of media peripheral devices 118 interface to the MPS 102 via a wired or wireless connection.

The MPS 117 interfaces, via a wired or wireless connection, to the media NAS unit 120 at the second private home 119. Each media peripheral device in the plurality of media peripheral devices 122 interface, via a wired or wireless connection, to the MPS 117. The MPS 123 interfaces, via a wired or wireless connection, to the media NAS unit 125 at the place of business 124.

The PC's 109, 110, and 123 (i.e., the MPS 123) may comprise desktop PC's, notebook PC's, PDA's, or any computing device. The broadband network infrastructure 101 may include cable infrastructure, DSL infrastructure, the Internet, intranet infrastructure, and broadband access headends including a cable headend, and a satellite headend, for example, in order to provide communications between, for example, the first private home 103, the second private home 119, the place of business 124, and the $3^{rd}$ party media provider 127.

The home network 107 may include home PNA (phoneline networking alliance) infrastructure, home cable infrastructure, Ethernet infrastructure, and 802.11b wireless infrastructure, for example, providing peer-to-peer networking capability within the first private home 103. The $3^{rd}$ party media provider 127 may include, for example, a provider of digital music, a provider of digital movies, or a provider of consumer services (e.g., software updates from a media peripheral device manufacturer).

The MMS's in the MPS's 102, 117, and 123 each comprise a software platform operating on at least one processor to provide certain functionality including user interface functionality, distributed storage functionality, and networking functionality. For example, a MMS may provide personal media channel construction supporting audio, video, images, image sequence selection, text, voice overlay, channel and program naming, and inter-home MPS routing selection, in accordance with an embodiment of the present invention. In addition, the MMS software platform in a PC-based MPS such as MPS 123 may permit access to over-the-air broadcast media using a television tuner card installed within the MPS 123. An MPS is also known, herein, as a media-box and/or an M-box.

The media exchange server 126 provides the functionality of distributed networking capability, archival functionality (long term media storage), temporary storage (to aid in the distribution and routing of media), distributed storage management, digital rights management (e.g., authentication/authorization), network management, billing, and software application program interfacing on the media exchange network 100, in accordance with an embodiment of the present invention.

A media NAS unit comprises a collection of mass storage devices contained in a single unit with a built-in operating system. A NAS unit is a dedicated computer that manages storage devices and is "tuned up" to store media. A NAS unit may serve a single user or many users on a media exchange network at the same time. A NAS unit buffers up storage, retrieval, and print jobs and may include, for example, an Ethernet card for connectivity.

Figure 2:
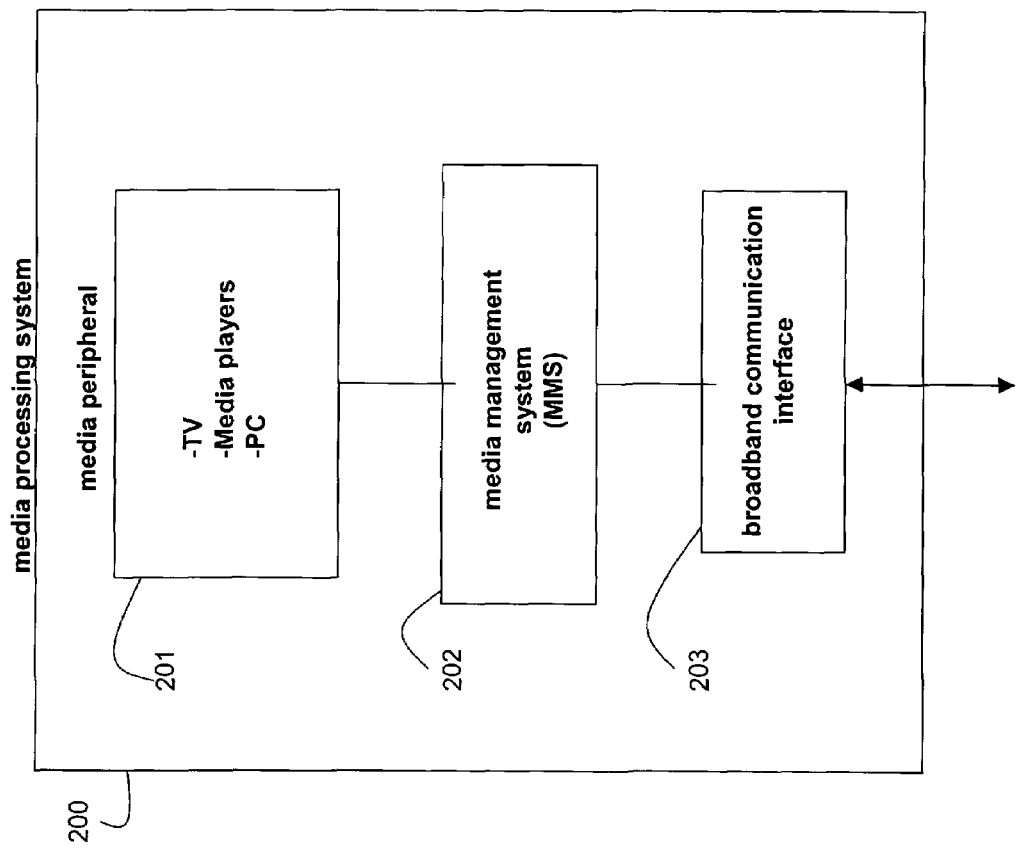
FIG. 2 is a diagram illustrating an embodiment of an MPS (media processing system), in accordance with various aspects of the present invention.

FIG. 2 is a diagram illustrating an embodiment of an MPS (media processing system) 200, in accordance with various aspects of the present invention. The MPS 200 comprises a media peripheral 201 (e.g., a TV), a MMS 202, and a broadband communication interface 203. The media peripheral 201 may also comprise a media player or a PC, for example. The broadband communication interface 203 provides connectivity to a broadband network infrastructure such as, for example, the broadband network infrastructure 101 of FIG. 1. The broadband communication interface 203 may include, for example, a cable modem, a DSL modem, or an Ethernet card. In accordance with an embodiment of the present invention, an MPS may also include a remote control user interface to allow control of the functionality of the MPS using, for example, a remote control device, a keyboard, and/or a mouse.

Figure 3:
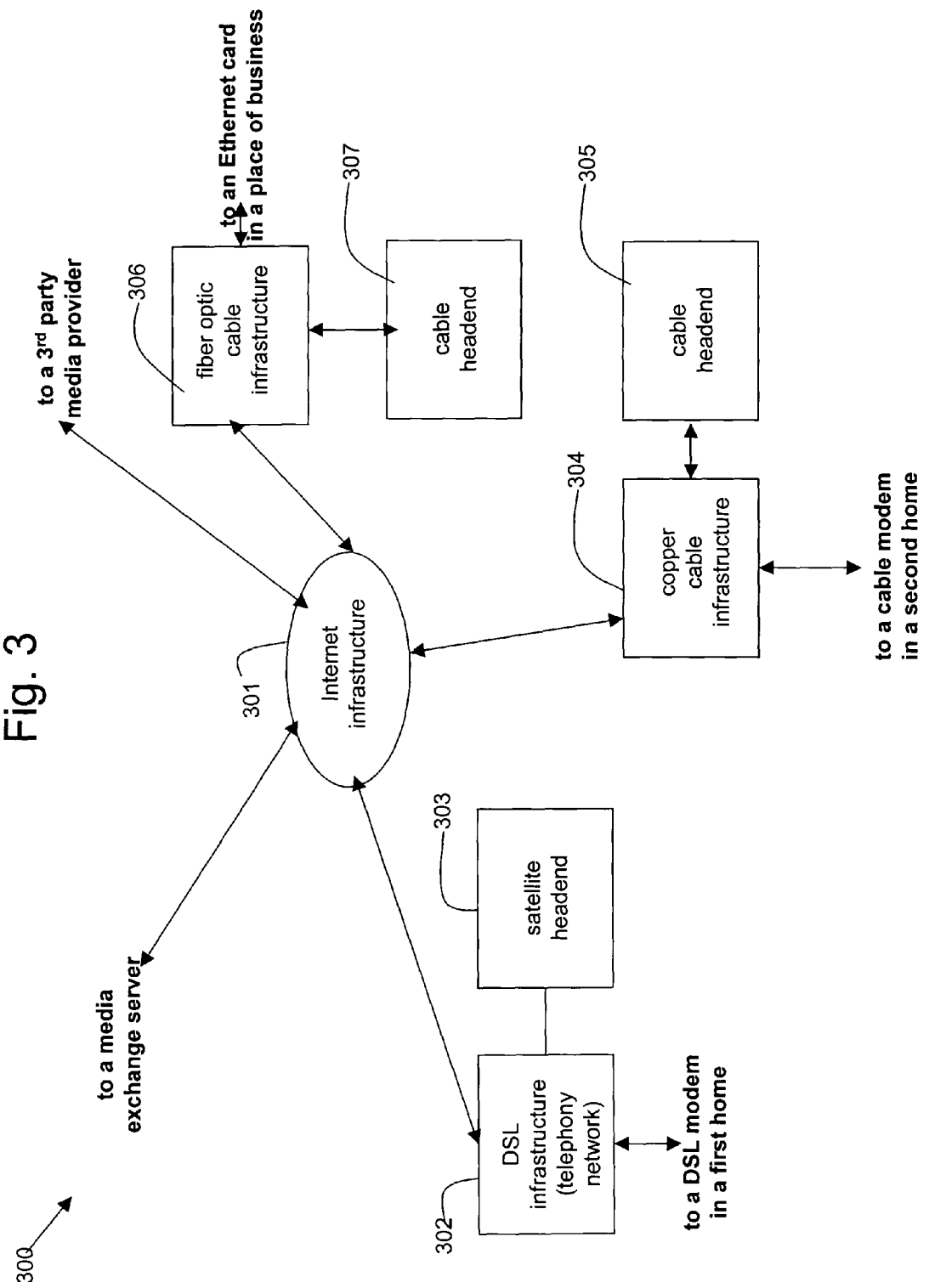
FIG. 3 is a diagram illustrating an embodiment of the broadband network infrastructure illustrated in FIG. 1, in accordance with various aspects of the present invention.

FIG. 3 is a diagram illustrating an embodiment of a broadband network infrastructure 300 being representative of the broadband network infrastructure 101 illustrated in FIG. 1, in accordance with various aspects of the present invention. The broadband network infrastructure 300 comprises an Internet infrastructure 301, a DSL infrastructure 302, a satellite headend 303, a copper cable infrastructure 304, a first cable headend 305, a fiber optic cable infrastructure 306, and a second cable headend 307.

The DSL infrastructure 302, the copper cable infrastructure 304 and the fiber optic cable infrastructure 306 each interface to the Internet infrastructure 301. The Internet infrastructure 301 may also interface to a media exchange server and a 3$^{rd}$ party media provider in a media exchange network.

The DSL infrastructure 302 interfaces to the satellite headend 303 which is managed by a satellite program provider. The copper cable infrastructure 304 interfaces to the first cable headend 305 which is managed by a first cable program provider. The fiber optic cable infrastructure 306 interfaces to the second cable headend 307 which is managed by a second cable program provider. The second cable program provider is very similar to the first cable program provider except programming is routed over fiber optic cable instead of traditional copper cable.

The DSL infrastructure 302 also interfaces to a DSL modem in a first home (e.g., the first private home 103 of FIG. 1) to provide satellite programming and other services to the first home. The copper cable infrastructure 304 also interfaces to a copper cable modem in a second home (e.g., the second private home 119 of FIG. 1) to provide cable programming and other services to the second home. The fiber optic cable infrastructure 306 interfaces to an Ethernet card in a place of business (e.g., the place of business 124 of FIG. 1) to provide cable programming and other services to the place of business. In accordance with an embodiment of the present invention, the DSL modem may interface to an MPS in the first home, the cable modem may interface with an MPS in the second home, and the Ethernet card may interface with an MPS in the place of business.

In accordance with an alternative embodiment of the present invention, the DSL modem in the first home may be part of a DSL MPS. In accordance with an alternative embodiment of the present invention, the cable modem in the second home may be part of a cable MPS. In accordance with an alternative embodiment of the present invention, the Ethernet card in the place of business may be part of a Ethernet MPS in the third home. In such alternative embodiments, the DSL modem, the cable modem, and the Ethernet card each constitute a broadband communication interface within an MPS as illustrated in FIG. 2.

Figure 4:
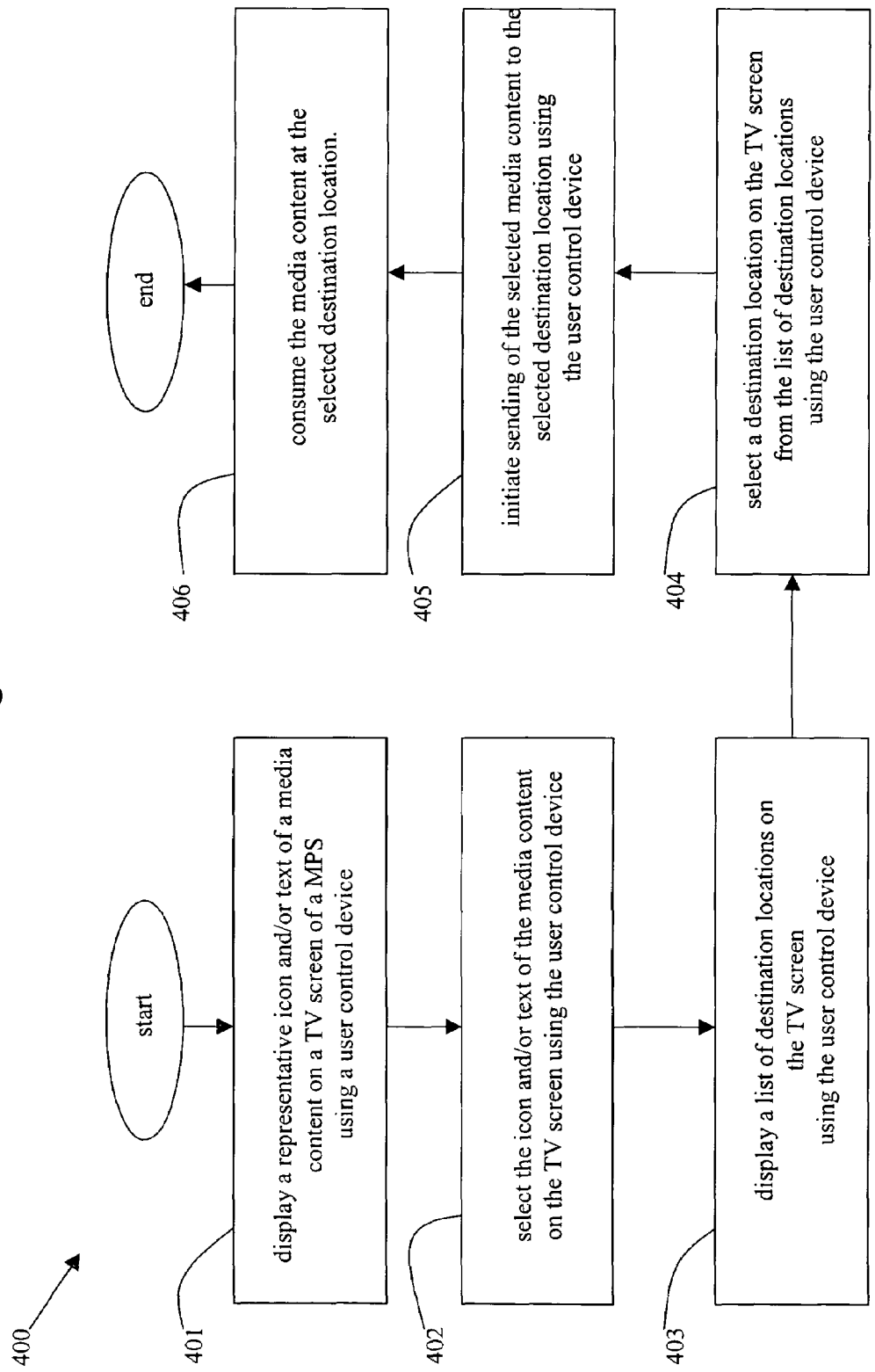
FIG. 4 is a flowchart illustrating an embodiment of a method, using the media exchange network of FIG. 1, for performing media exchange, in accordance with various aspects of the present invention.

FIG. 4 is a flowchart illustrating an embodiment of a method 400, using the media exchange network 100 of FIG. 1, for performing media exchange, in accordance with various aspects of the present invention. In step 401, a representative icon and/or text of media content (e.g., a media content file) is displayed on a TV screen of an MPS using a user control device (e.g., an MPS remote control). For example, a title of a media content file may be displayed in a scheduled time slot of a channel in a channel view (a.k.a., a media guide). In step 402, the icon and/or text of the media content is selected on the TV screen using the user control device. In step 403, a list of destination locations (e.g., other MPS's on a media exchange network) is displayed on the TV screen using the user control device. In step 404, a destination location is selected on the TV screen from the list of destination locations using the user control device. In step 405, sending of the selected media content to the selected destination location is initiated using the user control device. In step 406, the media content is consumed at the selected destination location.

Figure 6:
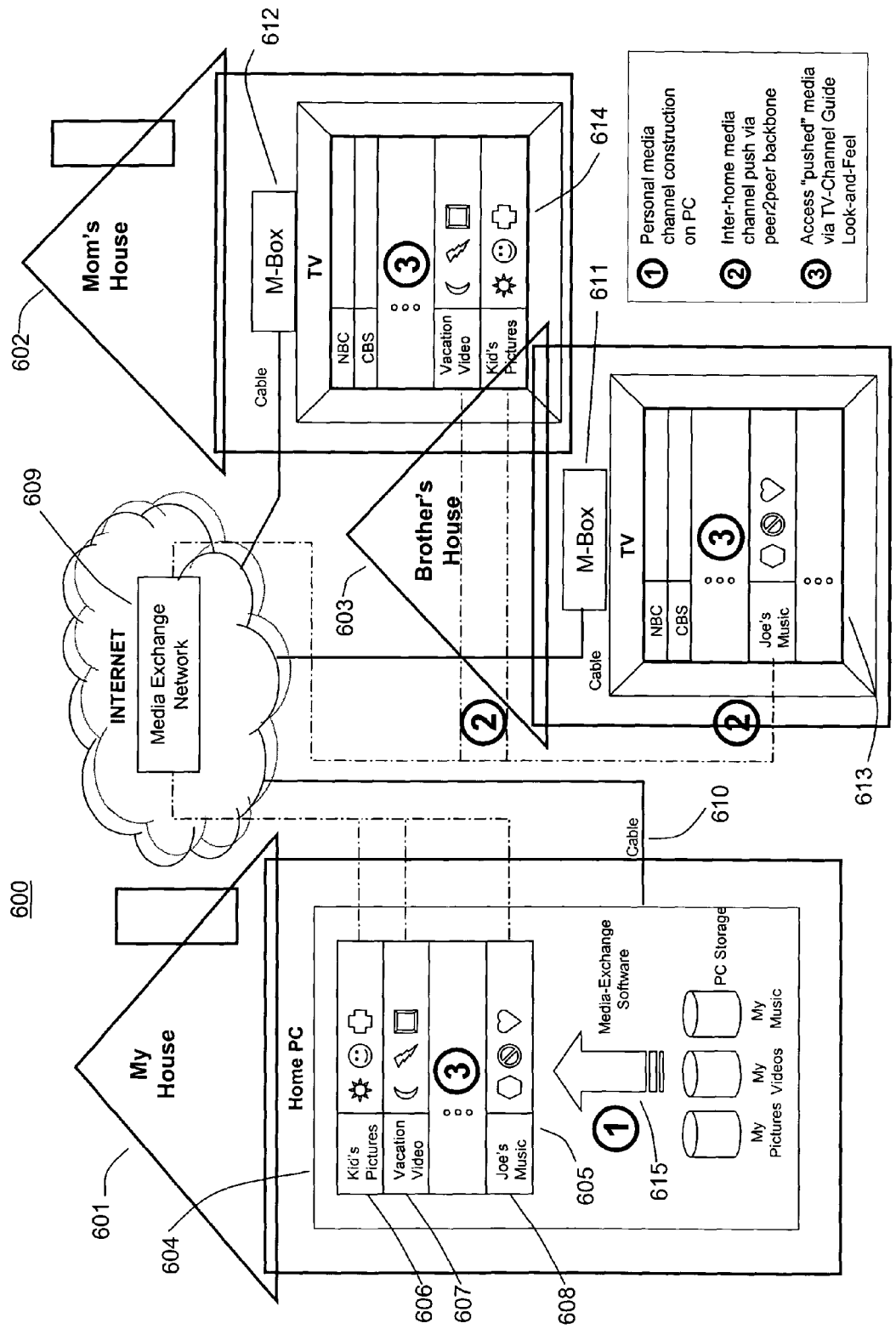
FIG. 6 and FIG. 7 illustrate two types of media push, personal and third party, respectively, in accordance with embodiments of the present invention.

The following example demonstrates the method for performing media exchange illustrated in the flowchart of FIG. 4, using the elements of shown in FIG. 1 and FIG. 6. Let us assume that a user of a MPS such as the MPS 102 at the first private home 103 wishes to transfer a file of digital images to the user of a second MPS such as the MPS 117 at the second private home 119. In this example, the first private home 103 of FIG. 1 may correspond to "My House" 601 of FIG. 6, and the second private home 119 may correspond to "Mom's House" 602 or "Brother's House" 603. The user of the MPS 102 uses the remote control 106 to display a channel view, such as the channel view 605 of FIG. 6, on the TV screen 105. The channel view 605 includes a channel listing the file of digital images. For example, in the channel view 605, the file of digital images may be listed as "Kid's Pictures" 606. The user of the MPS 102 then selects "Kid's Pictures" 606 on the TV screen 105 using the remote control 106. Next, the user of the MPS 102 uses the remote control 106 to call up and display a list of destination locations that exist on the media exchange network 100. The displayed list may show, for example, "Mom's House" 602 and "Brother's House" 603. The user of the MPS 102 (e.g., at "My House" 601) then selects a destination location corresponding to the MPS 117 (e.g., at "Mom's House" 602) using the remote control 106. The user of the MPS 102 (e.g., "My House" 601) then uses the remote control 106 to initiate sending the file of digital images corresponding to "Kid's Pictures" 606 to the MPS 117 (e.g., at "Mom's House" 602) over the media exchange network 100. Once the file of digital images is received by the MPS 117, the user of the MPS 117 may view (i.e., consume) the file of digital images on the TV screen of the MPS 117.

In accordance with an embodiment of the present invention, a channel (e.g., channel 606 of FIG. 6) in a channel view (e.g., channel view 605 of FIG. 6) displayed by an MPS may just include a pointer to a media content file which is stored in, for example, a media NAS unit such as, for example, the media NAS unit 108 of FIG. 1. The media content file may be downloaded from the media NAS unit 108 to an MPS such as, for example, the first MPS 102 of FIG. 1, using the pointer, and then played on a media peripheral (e.g., a TV) such as the TV screen 105. Alternatively, the media content in the media content file could be streamed directly from, for example, the media NAS unit 108, to a media peripheral (e.g., a TV), such as the TV screen 105.

To better understand this aspect of the present invention, let us again refer to the elements of FIG. 1. In this example, let us assume a user of the MPS 102 selects a media content file on the TV screen 105 from a channel view, such as the channel view 605 of FIG. 6. For the purposes of this example, the channel view 605 stores a pointer that points to the media content file in the media NAS unit 108. Once selected, the media content file pointed to by the pointer is downloaded to an MPS, such as the MPS 102 of FIG. 1. The user of the MPS 102 may consume the media content file (e.g., view the media content on the TV screen 105), or push the media content file to another user on the media exchange network 100, for example, the user of MPS 117 at the second private home 119.

In accordance with an embodiment of the present invention, media content may be captured by a media peripheral device such as, for example, the digital camera 113 or the digital camcorder 114 of FIG. 1, in the form of a digital media content file, and delivered to a PC such as PC 113 of FIG. 1, via a wired or wireless connection. The digital media content file may then be downloaded from the PC 113 to a channel view (i.e., a media guide or channel view, such as channel view 605 of FIG. 6) of an MPS via a wired or wireless connection.

For example, referring again to the elements of the media exchange network 100 of FIG. 1, the digital camcorder 114 may be used to capture digital video of a family vacation. The digital video may be downloaded to the PC 110 via a wireless link between the digital camcorder 114 and the PC 110 at the first private home 103. The digital video may then be downloaded to the STB 104 via the home network 107 and stored in a channel such as, for example, channel 607 of FIG. 6 of a channel view (i.e., media guide), such as the channel view 605. The digital video may be viewed by the user of the MPS 102 on the TV screen 105, or pushed to another user of the media exchange network 100 such as, for example, a user of the MPS 117 at second private home 119, using the method discussed above with respect to the illustration of FIG. 4.

In accordance with an embodiment of the present invention, a user of an MPS may browse $3^{rd}$ party media that is stored out on the Internet, pull the $3^{rd}$ party media, and play it on a TV screen. For example, referring once again to FIG. 1, a user of the MPS 117 at the second private home 119 may use the remote control 121 to search for $3^{rd}$ party media on the media exchange network 100, which includes Internet infrastructure and functionality. The user may discover, for example, a music CD provided by the $3^{rd}$ party media provider 127 and may pull the contents of the music CD to the MPS 117 over the media exchange network 100. This media content may appear as a channel such as, for example, the channel "Joe's Music" 608, as a part of a channel such as the channel view 605 of FIG. 6. The user may then access the media for consumption using the method described with respect to FIG. 4 and a channel view such as channel view 605 of FIG. 6. The $3^{rd}$ party media provider may bill the user of the MPS 117, or charge an account of the user of the MPS 117 for the media consumption. In an embodiment of the present invention, the billing for such media activities may be handled by a server such as, for example, the media exchange server 126.

Various functionality may be provided on a media exchange network in accordance with various aspects of the present invention. For example, functionality on a media exchange network such as, for example media exchange network 100 of FIG. 1 may include PC-to-STB and STB-to-STB non-broadcast media exchange via a media guide (a.k.a., channel view) and a remote control. A media guide such as, for example, the media guide (i.e, channel view) 605 of FIG. 6 lists various scheduled channels of media, and is displayed on a TV screen or PC monitor such as, for example, the TV screen 105 or PC monitor 109 of FIG. 1. Non-broadcast media includes personal user media and media generated by friends and family members. Media may be pulled to a STB such as, for example, the STB 104 of FIG. 1, or PC upon media guide selection with queuing, or pushed for local storage prior to media guide selection (no queuing). Media may be pushed to a storage server, and then pulled upon request with queuing.

Audio streaming and video streaming functionality may be provided between a PC and a STB and between a first STB and a second STB on a media exchange network, in accordance with an embodiment of the present invention. Functionality of automatic access and control of media peripheral devices via firewall and/or USB interfaces may be provided with a STB and a PC (e.g., an image camera, MPEG 2 video, a MP3 player), in accordance with an embodiment of the present invention. Address management functionality of network protocol addresses such as, for example, Internet protocol (IP) addresses, media access control (MAC) addresses, electronic serial numbers (ENS), etc., may be provided via a media exchange server on a media exchange network, in accordance with an embodiment of the present invention. Media migration and access functionality may be provided via a storage server on a media exchange network, in accordance with an embodiment of the present invention.

Functionality on a media exchange network may also include non-broadcast media exchange between a PC and multiple STB's, or between a STB and other multiple STB's via a media guide (a.k.a., channel view) and a remote control, in accordance with an embodiment of the present invention. For example, a user of an MPS such as, for example, the MPS 123 (i.e., the PC with a MMS) of FIG. 1 at the place of business 124, may push a file of digital data (e.g., a financial spreadsheet) to the MPS 102 and the MPS 117 over the media exchange network 100. The pushed media content may appear on a channel view (i.e., media guide) such as the channel view 605 of FIG. 6. The user of the MPS 102 may then download the financial spreadsheet to the PC 109 via the home network 107 for later viewing on the PC 109. The user of the MPS 117 may store the received financial spreadsheet on the media NAS unit 120 and then later access the spreadsheet from the media NAS unit 120 to view on the screen of the MPS 117 (i.e., the TV with the MMS) by accessing a channel shown on a channel view displayed on the MPS 117. The exemplary method of FIG. 4 supports such media exchange and consumption.

Sharing of digital media may be accomplished in an automatic and/or automated manner via personal broadcast channels. A media exchange network such as the media exchange network 100 of FIG. 1 may coordinate secure and authenticated personal network setup for multiple STB's and PC's and provide peripheral device registration and channel set up functionality, in accordance with an embodiment of the present invention. PC and STB based automatic program construction functionality may be provided with automatic and web based channel routing via a media exchange server, in accordance with an embodiment of the present invention. Personal network activity indications (e.g., pop-up visual and audio messages) may be delivered to a user via a media exchange server on a media exchange network, in accordance with an embodiment of the present invention.

In accordance with an embodiment of the present invention, PC based program editing and construction with channel routing may be provided via a media exchange server on a media exchange network. STB-to-STB voice exchange using packet cable telephony infrastructure may be provided on a media exchange network. In accordance with an embodiment of the present invention, a media exchange server on a media exchange network supports theft prevention and "STB Hotspot" operation of media peripheral devices via registration and security functions. Date and Time access to media archived on a storage server (life archival) using media transcoding engines is supported in accordance with an embodiment of the present invention. In accordance with an embodiment of the present invention, a storage server on a media exchange network supports new media peripheral formats for consumption on legacy STB's or other media peripherals (on-request transcoding). In accordance with an embodiment of the present invention, non-broadcast commercial types may be pre-selected and made available for insertion into broadcast media.

Figure 5:
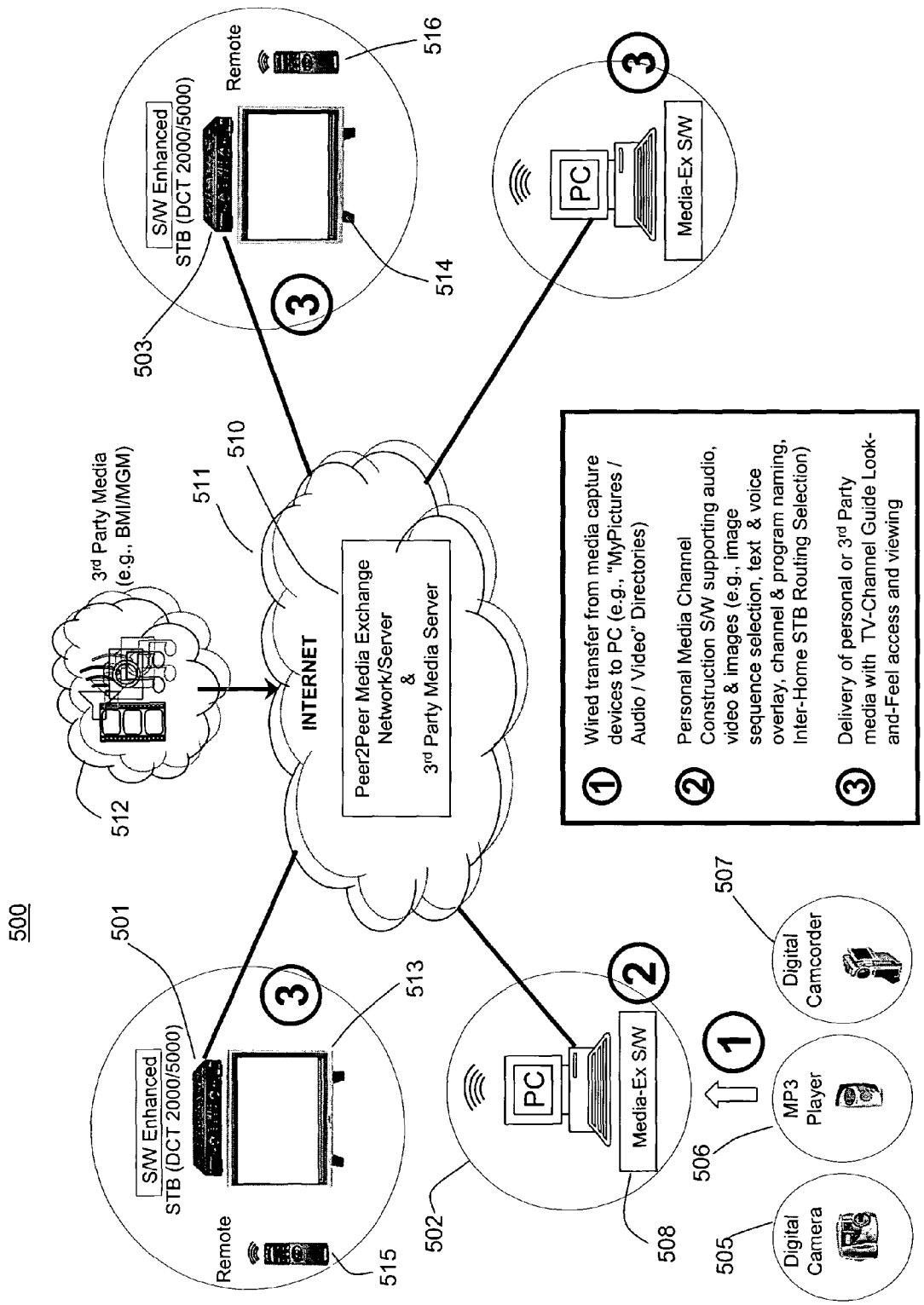
FIG. 5 comprises a media exchange network for exchanging and sharing media information in accordance with an alternate embodiment of the present invention.

FIG. 5 comprises a media exchange network 500 for exchanging and sharing media information, in accordance with an alternate embodiment of the present invention. In the illustration of FIG. 5, a PC 502 captures various types of media including, for example, digital media from a digital camera 505, an MP3 player 506, and a digital camcorder 507.

The PC 502 is equipped with media exchange software 508 to provide a user interface, distributed storage, and networking capability. For example, the media exchange software 508 may provide personal media channel construction supporting audio, video, images, image sequence selection, text, voice overlay, channel and program naming, and inter-home set-top-box routing selection, in accordance with an embodiment of the present invention.

In FIG. 5, the PC 502 interfaces to a peer2peer media exchange network/server 510 on the Internet 511, in accordance with an embodiment of the present invention. In an embodiment of the present invention, the peer2peer media exchange network/server 510 may comprise a single central server or may comprise a distributed server having software components distributed across various participants of the shared network environment.

The captured media information may be pushed by the PC 502 to a television set-top-box such as, for example, television set-top-boxes 501, 503, at a remote location through the peer2peer media exchange network/server 510. The television set-top-boxes 501, 503 also have media exchange software such as the media exchange software 508 installed within them. The pushed media information may be selected and viewed by a user by way of a television 513. 514 which is interfaced to the television set-top-boxes 501, 503, using a remote control such as remote control 515, 516. The media content may be selected and viewed on television set-top-boxes 501, 503 with a TV-channel guide look-and-feel provided by a channel view (a.k.a., channel guide) such as the channel view 605 of FIG. 6, as displayed by the media exchange software.

A third party media provider such as, for example, the $3^{rd}$ party media provider 512 of FIG. 5 may also deliver personal or third party media. Access to and viewing of such $3^{rd}$ party media may be provided to users of the PC 502 and/or television set-top-boxes 501, 503 via a channel view (a.k.a, media guide) with a TV-channel guide look-and-feel, such as the channel view 705 shown in FIG. 7, described below.

Figure 7:
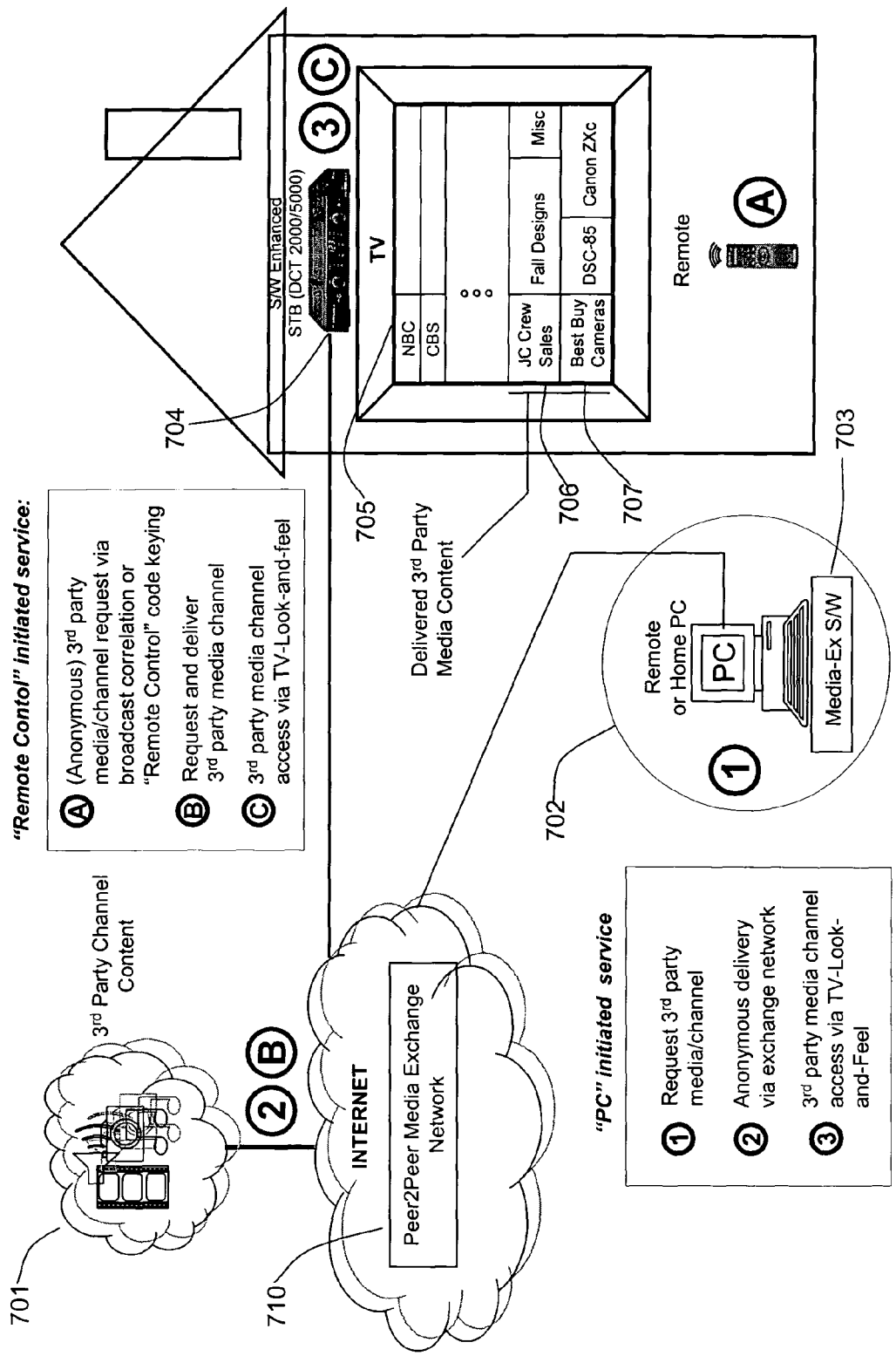

FIG. 6 and FIG. 7 illustrate two types of media push, personal and third party, respectively, in accordance with the present invention. Media exchange software such as the media exchange software 508 of FIG. 5 formats the media in a TV-like format and pushes the media from, for example, a home PC 604 at "My House" 601 to a media exchange network/server 609 through, for example, a cable 610, in accordance with an embodiment of the present invention. The home PC 604 may correspond to, for example, the PC 502 of FIG. 5. A "Brother's House" 603 and a "Mom's House" 602 may access the pushed media information through a installed media boxes 611, 612 (also known as M-boxes, which are software-enhanced set-top-boxes), at the respective houses. The M-boxes 611, 612 may correspond to, for example, the set-top-boxes 513, 514 of FIG. 5. The brother and Mom may each independently select which pushed media to view and at what time, using their respective media guides (a.k.a., channel views) 613, 614. Storage of the pushed media may be on the M-boxes 611, 612 when the M-box comprises sufficient storage such as, for example, a 80-120 Gigabyte memory. Storage may also be at various other sites on the network such as other PC's on the network or a service provider. Storage may also be on the pushing PC, such as PC 604 at "My House" 601.

In an embodiment of the present invention, a wireless interface may be provided between, for example, a digital camera such as the digital camera 505 of FIG. 5, and an M-box such as the M-box 611, or a digital camera 505 and a PC such as the PC 605, to provide automatic and wireless media capture.

FIG. 7 is a block diagram illustrating an example of media push from a $3^{rd}$ party 701 to a PC 702 and/or an M-box 704, in accordance with an embodiment of the present invention. The illustration of FIG. 7 shows a $3^{rd}$ party 701 communicating via a peer2peer media exchange network/server 710 with a PC 702 and an M-box 704. The PC 702 comprises media exchange software 703, that may correspond to the media exchange software 508 of FIG. 5. The M-box 704 supports a channel view (a.k.a., media guide) 705 comprising channels 706 and 707. The channel view 705 may correspond to one of channel views 613, 614 shown in FIG. 6. The peer2peer media exchange network/server 710 may correspond to, for example, the peer2peer media exchange network/server 510 of FIG. 5.

As shown in the illustration of FIG. 7, the media from the $3^{rd}$ party 701 may be requested by way of the PC 702 and/or the M-box 704 using a PC keyboard such as the PC keyboard 128 of FIG. 1, and/or a television remote control such as the television remote control 106 of FIG. 1. The $3^{rd}$ party 701 then pushes the requested media by way of the peer2peer media exchange network/server 710 to the PC 702 and/or M-box 704. In general, any participant having access to the peer2peer media exchange network/server 710 may push or request media information to/from any other participant on the peer2peer media exchange network/server 710.

Figure 8:
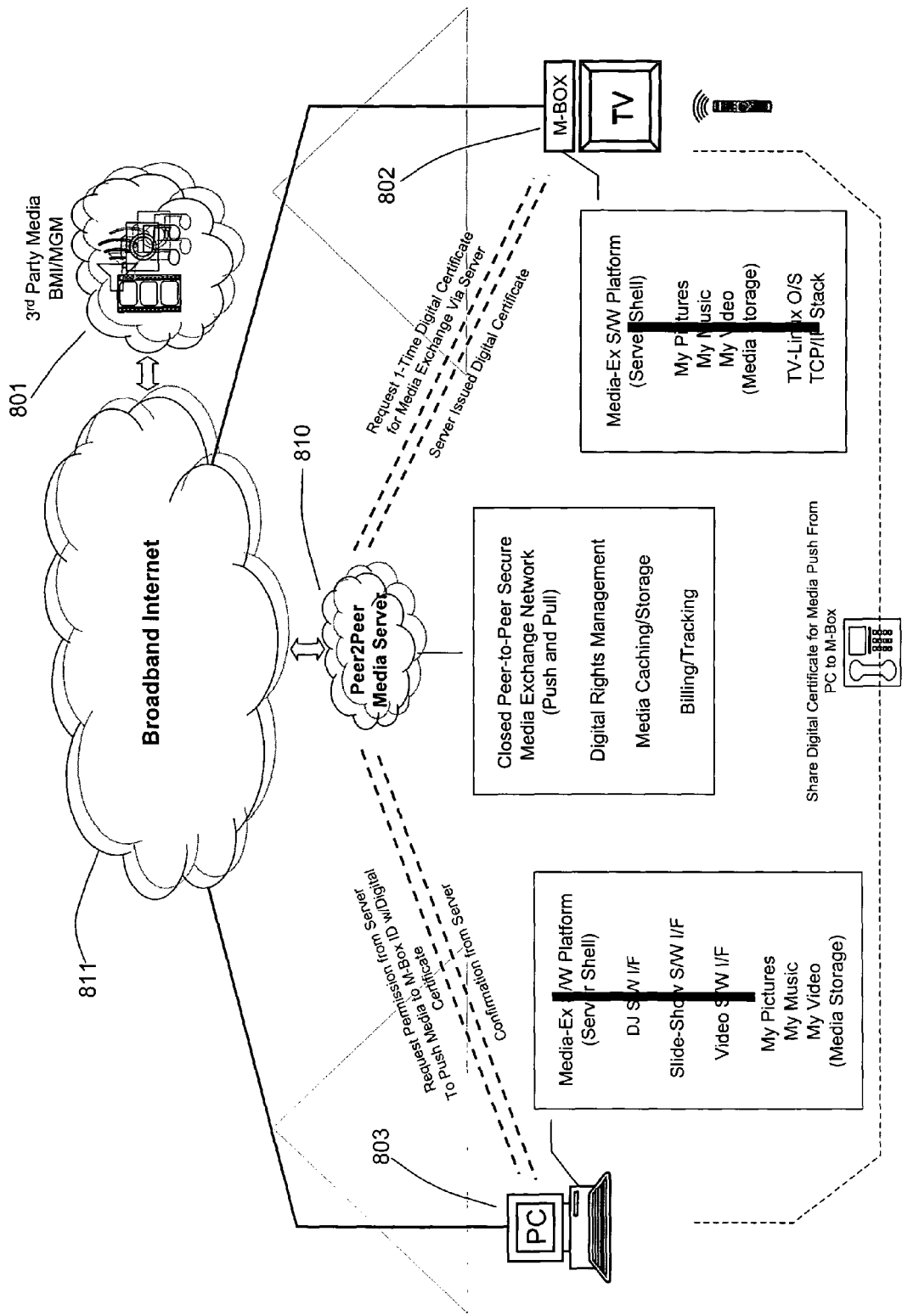
FIG. 8 illustrates an embodiment of the present invention comprising a PC-to-M-box media exchange network configuration.

FIG. 8 illustrates an embodiment of the present invention comprising a PC-to-M-box media exchange network configuration. The media exchange network configuration of FIG. 8 comprises a $3^{rd}$ party media provider 801, a broadband Internet 811, a peer2peer media server 810, a PC 803, and a M-box 802. The broadband Internet 811 interconnects the PC 803, the peer2peer media server 810, and the M-box 802. In the illustration of FIG. 8, the user of the PC 803 wishes to push media to the user of the M-box 802. In order to permit such a transfer in a secure and private manner, the peer2peer media server 810 may provide M-box 802 with a means of assuring the identity of a supplier of media, in the form of a digital certificate means (not shown). The user of the M-box 802 may request a digital certificate from the peer2peer media server 810, and either transmit the digital certificate to the PC 803, or request that the peer2peer media server 810 deliver the digital certificate to the PC 803.

In the example of FIG. 8, the digital certificate requested by the M-box 802 and supplied by the peer2peer media server 810 is a "one-time" digital certificate. A one-time digital certificate is valid for a single use, permitting a provider of media such as, for example, the PC 803, to perform a single transfer of media to the authorizer. The peer2peer media server 810 may be requested to provide digital certificates for other users of the media exchange network such as, for example, friends and family, or for a $3^{rd}$ party media provider such as $3^{rd}$ party media provider 801. In either case, the digital certificate serves to prevent unwanted media pushes from people not known to a user. Media requests may still be made by a user of the M-box 802 through a normal direct request pathway or through an anonymous request pathway.

It should be noted that although the illustration of FIG. 8 only shows a PC 803 exchanging media with an M-box 802, the present invention is not limited to media exchanges between a PC and an M-box. For example, the media exchange illustrated in FIG. 8 and described above also applies to exchanges between a PC and a PC, or an M-Box and an M-box.

Figure 9:
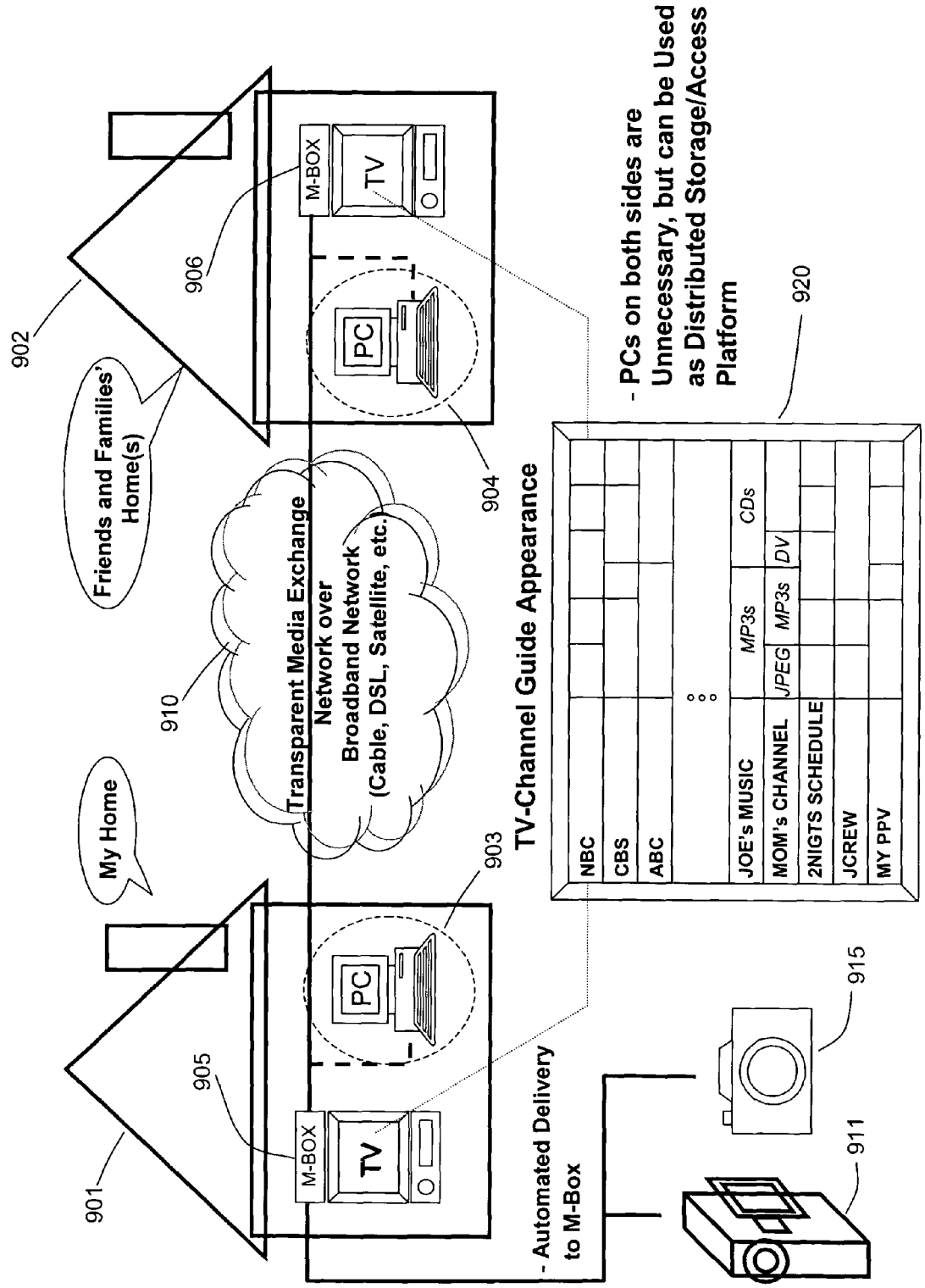
FIG. 9 illustrates an alternate embodiment of the present invention that provides digital media exchange.

FIG. 9 illustrates an alternate embodiment of the present invention that provides digital media exchange. The illustration of FIG. 9 shows two homes, "My Home" 901, and "Friends and Families' Home(s)" 902, connected by a media exchange network 910. Located at "My Home" 901 is an M-box 905 and a PC 903. Located at "Friends and Families'

Home(s)" 902 is an M-box 906 and a PC 904. Although the PC's 903, 904 may be provided at both locations for distributed storage and access, they are not necessary. The illustration of FIG. 9 also comprises a digital camcorder 911 and a digital camera 915. A channel view 920 (a.k.a., media guide, TV channel guide look-and-feel interface) is also illustrated and that may be displayed on one or both of the M-boxes 905, 906, or in another embodiment of the present invention, on one or both of the PC's 903, 904. As shown, the configuration illustrated in FIG. 9 supports the automated delivery of media from the digital camcorder 911 and/or the digital camera 915 to the M-boxes 905, 906. The transfer of such media may be arranged by a user via channel view 920 by scheduling a "pull" of the media by one or more of the M-boxes 905, 906, or PC's 903, 904, or a push from the digital camcorder 911 or digital camera 915 to one or more of the M-boxes 905, 906, or PC's 903, 904. In an embodiment of the present invention, the PC's 905, 906 may be used for media consumption, or for distribution and/or storage of the media from the digital camcorder 911 and/or the digital camera 915. The secure and private push of media from the digital camcorder 911 and/or the digital camera 915 may be supported by the use of a digital certificate mechanism, as described above with respect to FIG. 8. It should be noted that the automated delivery illustrated in FIG. 9 is not limited to the digital camcorder 911 and digital camera 915 media peripherals shown, but may involve the use of alternate or additional media peripherals as well.

Figure 10:
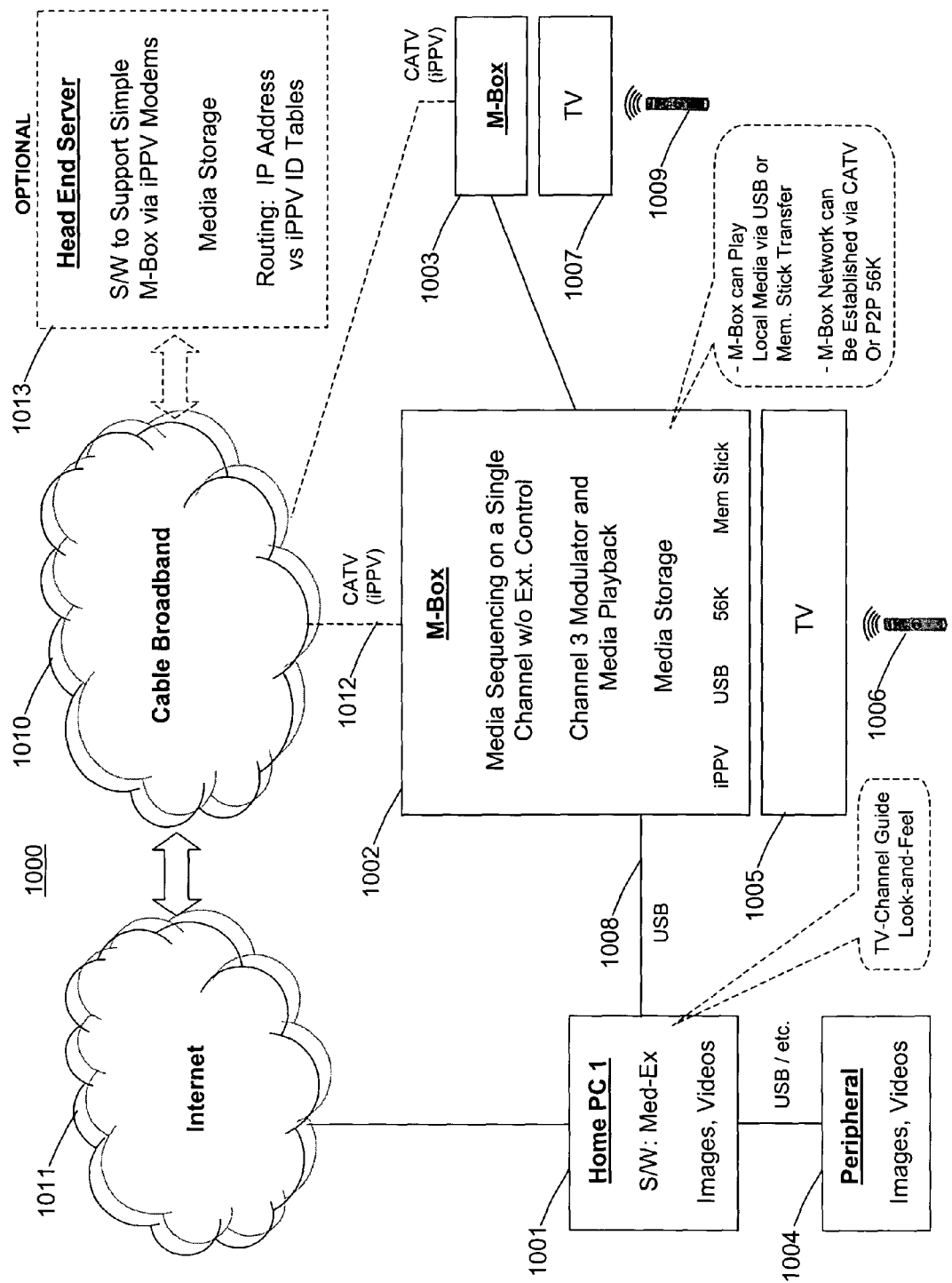
FIG. 10 illustrates an alternate embodiment of the present invention comprising an Internet infrastructure, a cable broadband infrastructure, and an optional head end server.

FIG. 10 illustrates an alternate embodiment of the present invention comprising an Internet infrastructure 1011, a cable broadband infrastructure 1010, and an optional head end server 1013. The illustration shows in greater detail an embodiment of a media exchange network 1000 such as the media exchange network 100 of FIG. 1. The media exchange network 1000 comprises an Internet infrastructure 1011, a cable broadband infrastructure 1010, and an optional head end server 1013. In addition, the exemplary embodiment of FIG. 10 comprises a home PC 1001, a first M-box 1002, and a second M-box 1003. The illustrated embodiment further comprises a media peripheral 1004, connected to home PC 1001. In the illustration the media peripheral 1004 is connected via a wired link such as, for example, a universal serial bus (USB), but may also be linked via a wireless connection, as described above with respect to FIG. 1. The media peripheral 1004 may correspond to one or more of, for example, the mobile multi-media gateway 111, the digital camcorder 114, the home juke-box 116, or the digital camera of FIG. 1. The home PC 1001 may correspond to home PC 101 of FIG. 1, and the M-boxes 1002, 1003 may correspond to the set-top-box 104 of FIG. 1.

The home PC 1001 of FIG. 10 may comprise media exchange software such as the media exchange software 508 of FIG. 5. As described above, such media exchange software may provide a user with a media guide (a.k.a., channel view) interface supporting the consumption of media such as, for example, still images and video. The home PC 1001 may also comprise an interface to support an interconnection to a co-located M-box. For example, an interconnection such as USB link 1008 may be used to interconnect a PC to a nearby M-box, such as M-box 1002. The M-box 1002 in FIG. 10 is communicatively coupled to other users of the media exchange network via cable television access via CATV link 1012. The M-box 1002 interfaces to a user via TV 1005 and remote control 1006. The M-box 1002 supports an RF interface to TV 1005, a 56 kbps modem, and both internal media storage and external media storage using, for example, an external storage means such as, for example, a memory stick device made by Sony Corporation.

The media exchange network shown in FIG. 10 also comprises a second M-box 1003, connected via a CATV link to the cable broadband infrastructure 1010 of the media exchange network 1000. A user interface for M-box 1003 is provided by TV 1007 and remote control 1009. In addition, the media exchange network 1000 of FIG. 10 comprises an optional head end server 1013 having software to support media storage, interfaces to simple M-box embodiments (not shown), and arrangements for routing of signals to/from the cable broadband infrastructure 1010, where iPPV ID addressing is used, from/to the Internet infrastructure 1011, where Internet protocol (IP) addressing is used.

Figure 11:
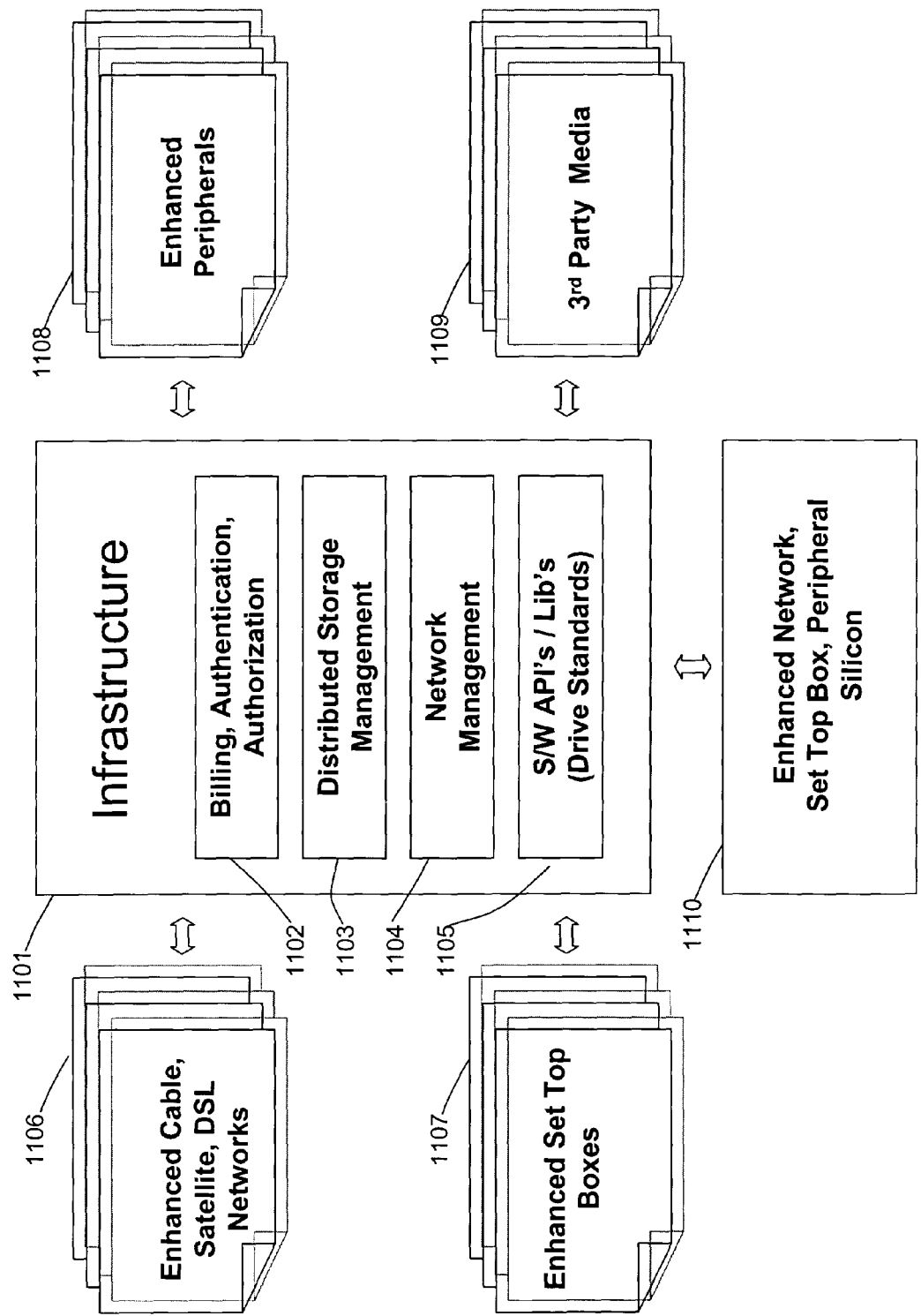
FIG. 11 is a schematic block diagram illustrating the various infrastructure elements associated with various embodiments of the present invention.

FIG. 11 is a schematic block diagram illustrating the various elements associated with various embodiments of the present invention. The elements shown in the illustration of FIG. 11 include infrastructure elements 1101 such as, for example, billing, authentication, and authorization 1102; distributed storage management 1103; network management 1104; and software application program interfaces (API's) and libraries 1105. Additional elements shown in the illustration of FIG. 11 include enhanced cable, satellite, and digital subscriber line (DSL) networks 1106; enhanced set top boxes 1107; enhanced peripherals 1108; $3^{rd}$ party media 1109; and enhanced network, set top box, and peripheral silicon (i.e., integrated circuit devices) 1110.

Figure 12:
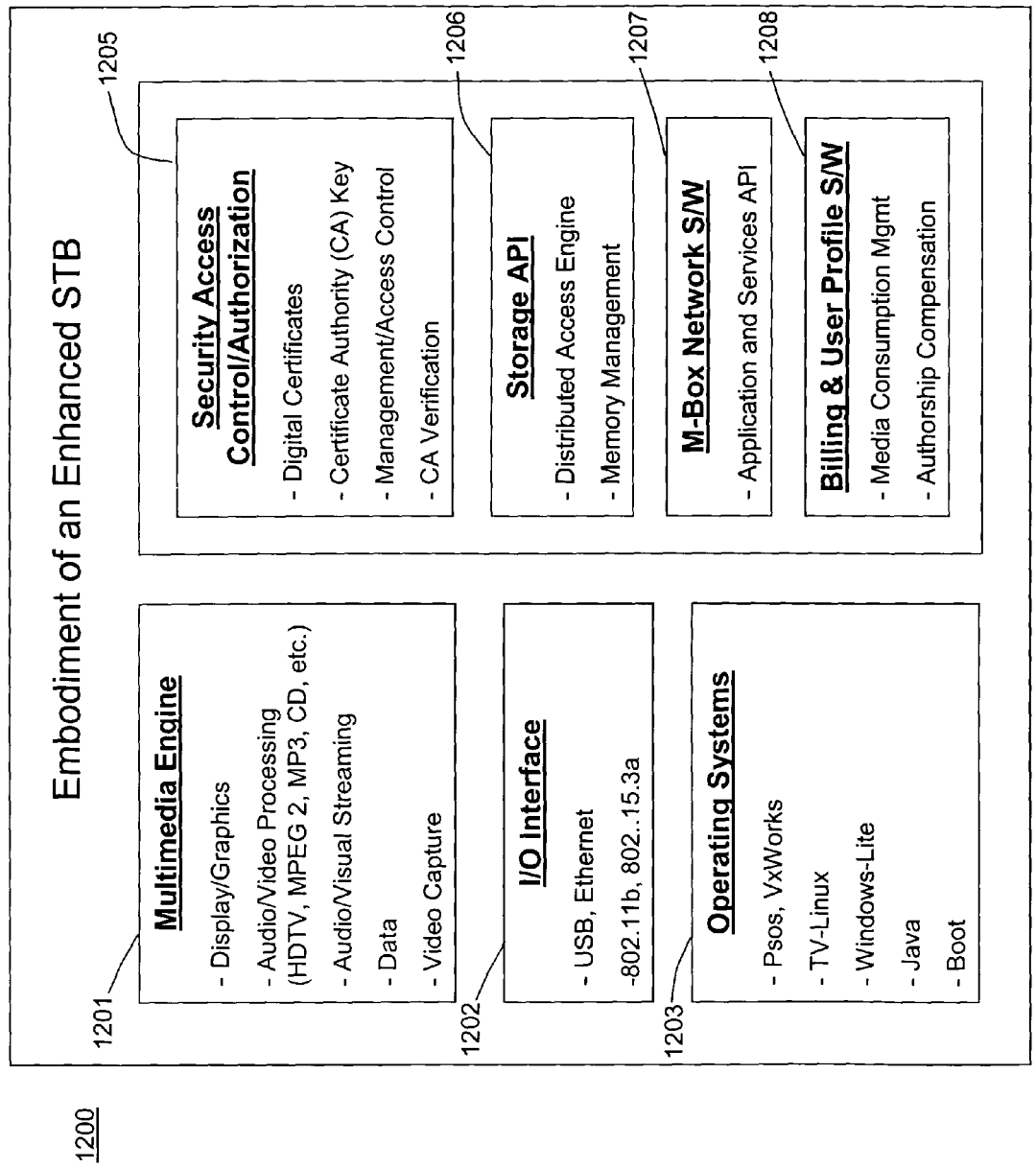
FIG. 12 illustrates the various functional elements of an enhanced set-top-box in accordance with an embodiment of the present invention.

FIG. 12 illustrates the various functional elements of an enhanced set-top-box 1200 in accordance with an embodiment of the present invention. The enhanced set-top-box 1200 of FIG. 12 comprises a multimedia engine functional element 1201, an I/O interface functional element 1202, an operating system functional element 1203. The illustrated embodiment of FIG. 12 also comprises a security access control/authorization functional element 1205, a storage application program interface (API) functional element 1206, a M-box network software functional element 1207, and billing and user profile software functional element 1208. The multi-media engine functional element 1201 may provide for the display of graphic such as, for example, still images, video, user interfaces, and the like. This functional element may also support the processing of audio and video encoded using such standards as the MPEG2 and MP3 standards, high resolution television (HDTV) signals, and digital data/audio from compact discs (CDs). The multi-media engine functional element 1201 may also support the capture of video from one or more of the media peripherals described with respect to FIG. 1, above.

The I/O interface functional element 1202 may comprise support for universal serial bus (USB) communication described with respect to FIG. 10, above. It may also support other forms of communication including, but not limited to, IEEE 802.11b and later forms of wireless local area network (LAN) communication, and IEEE 802.15.3a and later forms of short range wireless personal networks. This type of short range network was previously discussed with respect to the link between media peripherals such as the digital camera 113 or digital camcorder 114, and the PC 109 and set top box 104 of FIG. 1.

The operating system functional element 1203 may comprise a real-time operating system such as, for example, Psos or VxWorks from Wind River Systems, Java from Sun Microsystems, and similar operating system environments.

The security access control/authorization functional element 1205 may provide support for the digital certificate mechanism described with respect to FIG. 8, above. This functional element may also comprise support for the management of certificate authority (CA) keys, management and access control, and certificate authority verification. The storage application program interface (API) functional element 1206 may comprise support for a distributed access engine and memory management, to provide for the searching and access to storage distributed across a media exchange network 100 as shown in FIG. 1. The M-box network software functional element 1207 may comprise one or more application program interfaces (API's) to support the operation of the M-box described above with respect to FIGS. 6, 8, 9, and 10. The billing and user profile software functional element 1208 may comprise media consumption management software and authorship compensation support to provide the billing for and payment of amounts owed to media providers by users of an embodiment of the present invention.

Figure 13:
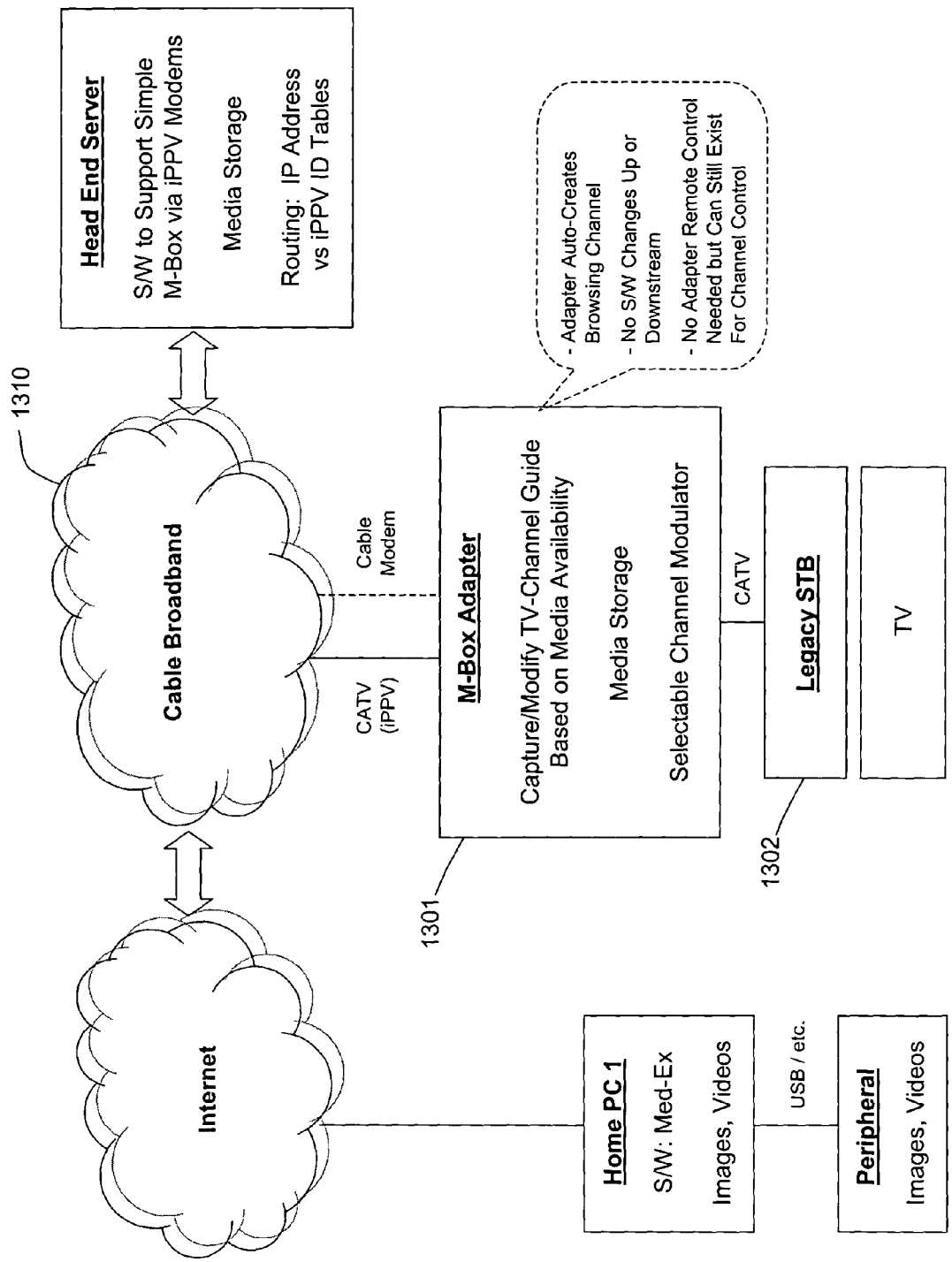
FIG. 13 illustrates legacy set-top-box support using an M-box adapter in accordance with an embodiment of the present invention.

FIG. 13 illustrates legacy set-top-box support using an M-box adapter 1301 in accordance with an embodiment of the present invention. The M-box adapter 1301 provides media storage, a selectable channel modulator, and capability to capture and modify a TV-channel guide such as the channel views (a.k.a. media guides) 613, 614 of FIG. 6, described above, based on media availability. The M-box adapter 1301 interfaces between the legacy set-top-box 1302 and a broadband cable interface with cable broadband infrastructure 1310, in accordance with an embodiment of the present invention. In such an embodiment, no software changes are required up-stream or down-stream from the M-box adapter 1301.

Figure 14:
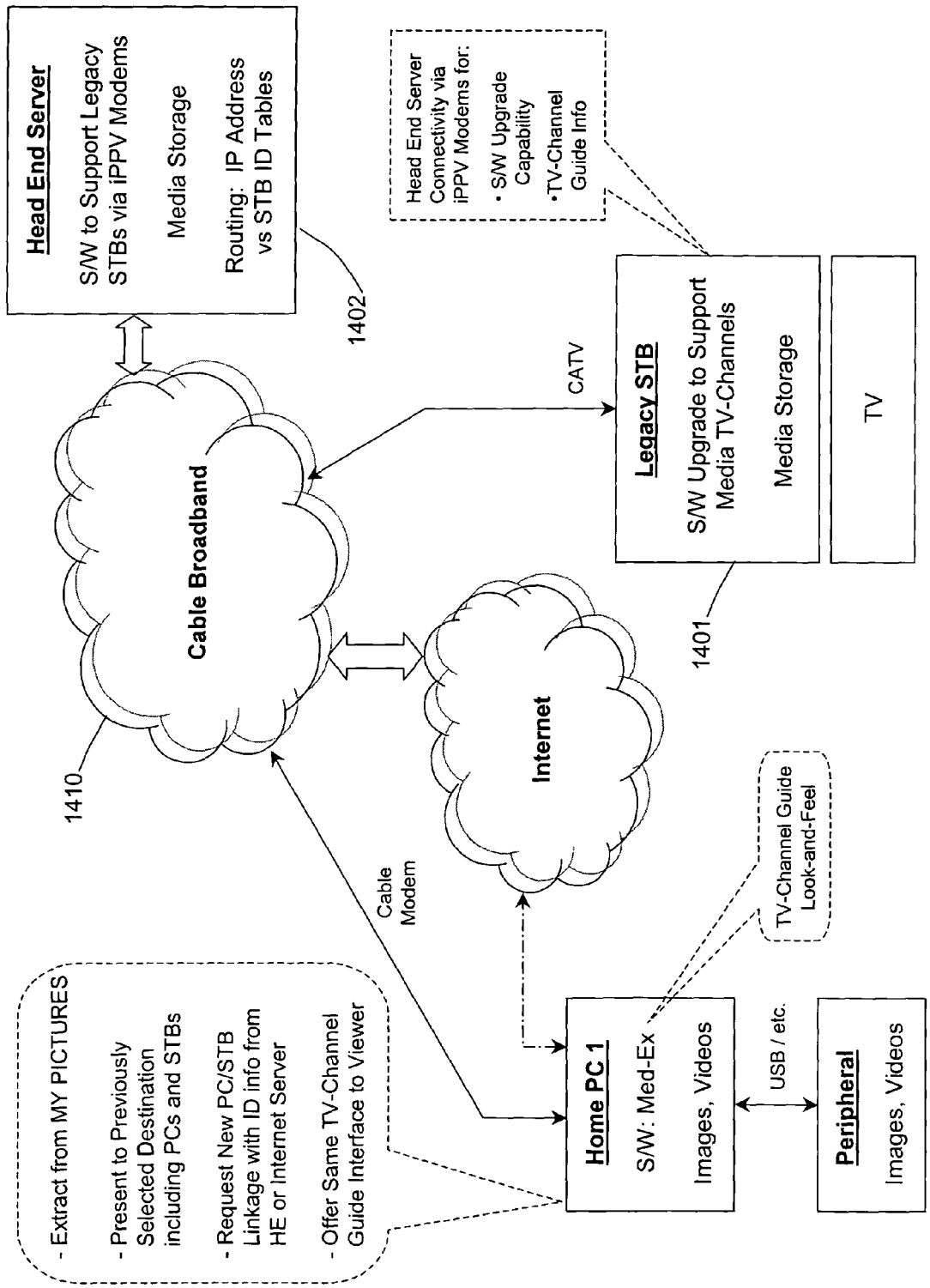
FIG. 14 illustrates legacy set-top-box support by upgrading the legacy set-top-box with software, in accordance with an embodiment of the present invention.

FIG. 14 illustrates legacy set-top-box support by upgrading the legacy set-top-box 1401 with software, in accordance with an embodiment of the present invention. The software upgrade allows the set-top-box 1401 to support media TV-channels using a TV-channel guide look-and-feel interface, such as the channel view (a.k.a., media guide) 613, 614 of FIG. 6. In addition, the software upgrade permits the legacy set-top-box 1401 to support the storage of media, and to allow access to the head end server 1402 to support the use of iPPV modems, to support routing of data between cable iPPV ID-based addresses and Internet infrastructure Internet protocol (IP) addresses used with the media exchange network infrastructure of such an embodiment, and to provide for media storage.

The various embodiments described above in at least FIGS. 5-14 enable the features described below.

At the highest level, features of the various embodiments of the present invention comprise transferring and sharing of digital media from one device/location to another with ease. The transfer and sharing is transparent to the user since the user is only interested in the entertainment aspects and not the networking aspects.

Certain key features of various embodiments of the present invention include a personal media storage network for sharing images, video, and music with friends and family and for selected third party content. Digital media is accessible via a legacy interactive TV channel guide interface requiring no learning curve and providing mass market appeal. Network set up and TV channel guide interaction are accomplished via a TV remote control device. A common channel guide interface is available on set-top-boxes, satellite, PC, etc.

Other key features include integrating media generating devices at network peripherals. Automated peripheral media access and peripheral control are provided via inter-home (personal) network. Inter-home roaming is supported based on authentication via digital certificates. Personal channels may be constructed such as, for example, a "Mom" channel, life archival selections, auctions, sales, commercials, classics, music, sitcoms, etc.

Certain embodiments of the present invention provide the infrastructure to support features such as authorship and media rights management. For example, a set-top-box will only work with a server and a digital certificate. The user is operating on a closed and secure platform.

Shared inter-home media experiences may be provided by embodiments of the present invention such as a multi-home media event with personal PIP/Audio exchange between family members and different locations, and single user control.

Monthly or pay-per-view/pay-per-listen billing may be provided by a service provider in accordance with an embodiment of the present invention.

An embodiment of the present invention provides a software platform for PCs and set-top-boxes (STBs) that enables personal media (pictures, video, music) channel construction, push, and TV-channel guide look-and-feel access and viewing across a secure peer2peer IP network. Media may be instantly pushed from a PC, or high-end STB, to any low or high-end STBs in a pre-established friends and family network. A media exchange network provides secure distribution of copyrighted third party content with billing support.

In accordance with an embodiment of the present invention, for an in-home network infrastructure, a multi-platform media storage network may extend to home PCs, set-top/PVR (M-box), media players, cameras, etc. Easy access is provided from an M-box to any stored media. The ability to remotely access any media or drive in the M-box, PCs, or appliances using a TV display as a monitor is provided.

In accordance with an embodiment of the present invention, for inter-home network infrastructure, a set-top/PVR engine may be enhanced (M-box) with additional operating system (windows-lite, TV-linux, etc.), TCP/IP, and HTTP stacks. M-boxes may connect to one another via broadband access networks such as cable, DSL, etc. Stored media (video, audio, music, etc.) may appear like regular TV channels (similar to PPV listings) to authorized connected users. M-box connection and networking aspects may be transparent to connected users, for example, with complete TV-like feeling provided.

In accordance with an embodiment of the present invention, IP exchange, authorization, and authentication is provided. Peripheral device (camera, phone, etc.) to M-box association may be based on digital certificate authorization and authentication. Each device may be provided with a "certificate key" (common to all devices), and a "device certificate" (unique for each device) where the M-box validates each device certificate with the "certificate key". A peripheral device may associate with a root M-box or any other M-box without further setup. Any peripheral that usually connects directly to a root M-box may also do so through any other M-box.

IP exchange, authorization, and authentication is based on a remote control box number or an IP address and a password in accordance with an embodiment of the present invention. IP exchange, authorization, and authentication may be through an internet PC, a cable provider, using an interactive M-box sync (i.e., handshaking). A telephone setup is also possible by manually entering an access number or using other M-box interaction. There may be, for example, cable company to cable company bridge/common M-box tables.

In accordance with an embodiment of the present invention, personal home media channels are provided that appear like regular TV channels or PPV channel listings (e.g., "Mom channel", "Brother channel"). Channel listings may be sorted by media type, category, date, previously viewed, etc. with options to "play only/play-copy-store/request-copy". Stored media in a root M-box automatically appears on other authorized M-boxes on the appropriate home media channels. A user may select from a home media channels list for viewing rights. Contents may be viewed once or N times with an option to destroy/erase from a remote system. For example, a view once/N times certificate may be obtained or the rights may be purchased, etc.

In accordance with an embodiment of the present invention, in the M-box network infrastructure, a personal M-box network is provided that supports multiple broadband access such as cable, DSL, satellite, and dial-up. Personal M-box network creation and maintenance are also provided. A linkage architecture is provided for all personal M-box networks. Remote/home access to a personal M-box network via the internet and PC for media scheduling/channel line-up, purchasing, and delivery is also provided. SPAM filtering and a firewall are also provided in the M-box network infrastructure.

Embodiments of the present invention provide M-box peripheral and storage support. Peripherals are associated with a home M-box. Peripheral roaming access/authorization/billing to any M-box may be provided, however. A distributed home/personal M-box network storage/access with "lifetime" archival (storage infrastructure) is provided. Personal media migration into the infrastructure network, servers, hosting, and caching is provided. Instant media availability throughout the personal M-box network, upon home M-box content creation/authorization, is provided. A media storage network extends from the M-box peripherals through the entire M-box network.

A TV-channel look-and-feel is provided to access media content in accordance with an embodiment of the present invention. For example, a PPV look-and-feel may be provided including the ability to queue start times. Channel listings may be sorted by media type, category, creation/availability date, previously viewed, etc. with options to "play_only", and/or "play_copy_store", and/or "request_copy". A computer look-and-feel may also be supported, in accordance with an embodiment of the present invention, for the computer-savvy. A head-end service provider may coordinate billing, playback, authorization, scheduling, and media rights in accordance with an embodiment of the present invention. An author may establish home media channel viewing rights, for example.

A personal media channel may be constructed from information on a user's, friend's, and family's M-box, peripheral, and internet PC media storage in accordance with an embodiment of the present invention. Embodiments of the present invention support, for example, "Mom/Brother/Family/Friends" channels. Instant availability of created media by peripherals across personal channels in the M-box network is provided. Media search and browsing capability and an individual's life archival channel storing all media are provided as well.

A vendor media channel may be constructed from a multitude of vendor's M-boxes, peripherals, internet, and head-end (service provider) stored media in accordance with an embodiment of the present invention. Vendor media and associated media may be identified via searching and browsing via an M-box or internet PC. Vendor video/audio/image databases with billing and tracking are supported. The vendor databases may include, for example, new releases, classics, thrillers, MGM, BMI, sports, and news.

In accordance with an embodiment of the present invention, a vendor may pre-construct a media channel selection. Pre-constructed media channels may be selected from a vendor's M-box, peripheral, internet, or head-end (service provider) media storage. An auction channel may be supported with a user-driven QVC-like TV channel interface. Vendor sales channels with user selectable content may be provided.

A vendor may support pre-construction for a given user on the fly based on a user profile, user requests, and user restrictions. Access via a search engine, reference (routing) number (identified in a TV commercial or from internet PC web page browsing) may be supported. An M-box may receive a reference number via remote control (number entry or new request button associated with a current commercial) or via internet PC "forwarding". Automatic commercial/advertisement insertion by pre-selection or user profile may be supported. Billing via PC internet web page interaction and/or PPV look-and-feel may be supported.

An audio look-and-feel may be offered and may have the same look-and-feel as TV music channels in accordance with an embodiment of the present invention. Also, direct audio amplifier delivery via an M-box may be provided (Aux. Dongle, Low power FM modulation). MP3 interchange between any two media player M-box peripherals may be provided through a personal M-box network and beyond. Streaming support of M-box audio/video/peer-to-peer/master-slave may be supported.

In accordance with an embodiment of the present invention, a legacy STB may be supported. An auxiliary M-box adapter may be offered that attaches to legacy STB's to provide full M-box functionality. In accordance with an alternative embodiment of the present invention, legacy STB's may be supported with a software upgrade at a head-end and legacy STB push capability from a user's/friend's/family's/third party's internet PC or from friend's/family's/third party's M-box or legacy STB with an auxiliary M-box adapter. Low-bandwidth images and possibly audio may be supported. A head-end may deliver a software upgrade with integrated personal media as part of the user interface to provide a "menu" sequence that appears as a channel. For example, when a user selects "Mom's channel", a menu sequence of Mom's images are presented to the user for viewing.

In accordance with an embodiment of the present invention, media consumption from local or remote storage may create a billing event charged through a cable company as PPV or PPlisten, or may be charged via a PC account set up and managed to a credit card or other payment source. Collection could be delivered to the author from the cable company. Media copyright piracy prevention and usage tracking/consumption/certificates may be provided. Contents may be viewed once or N times with an option to destroy/erase from the remote system. M-box personal billing profiles and processing/authorization may be provided via the cable network. An M-box credit card/smart card/cell phone/PDA purchasing peripheral may be provided and used. A billed party may be the media consumer or the party delivering the media or arranging the media delivery, for example.

Other features supported by embodiments of the present invention include real-time video/audio inter-home media experience (personal picture-in-picture (PIP), multicasting), media-meta data support and M-box display, marketing/user profiling support, home appliance access as part of home M-box network, cell-phone call routing via home M-box, screen saver TV mode (e.g., art, recent family images, etc.).

In summary, a system and method provide for the exchange and sharing of media between, for example, family members and friends in an efficient, user-friendly, and economically viable manner over a closed and secure media exchange network using an MPS with a remote control and TV screen, for example, in accordance with an embodiment of the present invention.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system supporting exchange of media, said system comprising:
   a first television in a first home;
   a first storage in the first home that stores the media; the first storage supporting consumption of the media by the first television in the first home, and having a first network address with respect to a first user in the first home;
   a user interface displayed on the first television in the first home, the user interface having at least one view comprising a representation of media available for consumption, the user interface supporting delivery of the media to a second home;
   a second television in the second home;
   a second storage supporting consumption of the media by the second television in the second home, and having a second network address with respect to a second user in the second home, wherein the second user is known to the first user;
   a communication network; and
   server software that maintains a user defined association of the first and second network addresses and that receives a request that identifies one of the associated first and second network addresses and responds by identifying the other of the associated first and second network addresses to support delivery via the communication network of the media from the first storage to the second home for consumption by the second television.

2. The system of claim 1 wherein the first and second network addresses are one of an Internet protocol (IP) address, a media access control (MAC) address, or an electronic serial number (ESN).

3. The system of claim 1 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

4. The system of claim 1 wherein the communication network is the Internet.

5. The system of claim 1 wherein the media comprises one or more of audio, a still image, video, and/or data.

6. The system of claim 1 wherein the media comprises real-time video.

7. The system of claim 1 wherein consumption comprises one or more of playing audio, displaying a still image, displaying video, and/or displaying data.

8. A system supporting exchange of media, said system comprising:
   a first storage in a first home that stores the media, and having a first protocol address with respect to a first user in the first home;
   a user interface in the first home, the user interface having at least one view comprising a representation of media available for consumption, the user interface supporting delivery of the media from the first storage in the first home to a second home;
   a television in the second home, and having a second protocol address with respect to a second user in the second home, wherein the second user is known to the first user;
   set top box circuitry, in the first home, communicatively coupled to deliver the media from the first storage to the television for consumption;
   a communication network; and
   server software that maintains a user defined association of the first and second protocol addresses and that receives a request that identifies one of the associated first and second protocol addresses and responds by identifying the other of the associated first and second protocol addresses to support delivery via the communication network of the media from the first storage to the second television for consumption.

9. The system of claim 8 wherein the media comprises one or more of audio, a still image, video, and/or data.

10. The system of claim 9 wherein the media comprises real-time video.

11. The system of claim 8 wherein the first and second protocol addresses are one of an Internet protocol (IP) address, a media access control (MAC) address, or an electronic serial number (ESN).

12. The system of claim 8 wherein consumption comprises one or more of playing audio, displaying a still image, displaying video, and/or displaying data.

13. The system of claim 8 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

14. The system of claim 8 wherein the communication network is the Internet.

15. The system of claim 8 wherein the server software supports anonymous media exchange.

16. The system of claim 8 wherein the server software forwards media from the first storage to the second television.

17. The system of claim 8 wherein the server software is at a location separate from the first home and the second home.

18. A system supporting exchange of media, said system comprising:
   a first storage in a first home that stores the media;
   a user interface in the first home, the user interface having at least one view comprising a representation of media available for consumption, the user interface supporting delivery of the media from the first storage in the first home to a second home;
   a television in the second home;
   set top box circuitry, in the first home, communicatively coupled to deliver the media from the first storage to the second home for consumption by the television;
   a closed and secure communication network, wherein the media is delivered from the first storage to the second home for consumption by the television via the closed and secure communication network; and
   server software that coordinates delivery of the media from the first storage to the set top box circuitry, the server software maintaining a user defined association of first and second network addresses with respect to first and second users, respectively, in the first and second homes, respectively.

19. The system of claim 18 wherein the media comprises one or more of audio, a still image, video, and/or data.

20. The system of claim 19 wherein the media comprises real-time video.

21. The system of claim 18 wherein consumption comprises one or more of playing audio, displaying a still image, displaying video, and/or displaying data.

22. The system of claim 18 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

23. The system of claim 18 wherein the communication network is the Internet.

24. The system of claim 18 wherein the server software supports anonymous media exchange.

25. A system supporting exchange of media, said system comprising:

a user interface in a first home, the user interface having at least one view comprising a representation of media available for consumption, the user interface supporting delivery of media from a first storage in the first home to a second home;

set top box circuitry, in the first home, communicatively coupled to deliver the media from the first storage at the first home, to the second home for consumption by a television; and software that maintains a user defined association of first and second network addresses with respect to first and second users, respectively, in the first and second homes, respectively, wherein the first and second users know one another, the software receives a request that identifies one of the associated first or second network addresses and responds by identifying the other of the associated first or second network addresses to support delivery via a communication network of media from the first storage in the first home to the second home, for consumption by the television.

26. The system of claim 25 wherein the first and second network addresses are one of an Internet protocol (IP) address, a media access control (MAC) address, or an electronic serial number (ESN).

27. The system of claim 25 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

28. The system of claim 25 wherein the communication network is the Internet.

29. The system of claim 25 wherein the media comprises one or more of audio, a still image, video, and/or data.

30. The system of claim 25 wherein the media comprises real-time video.

31. The system of claim 25 wherein consumption comprises one or more of playing audio, displaying a still image, displaying video, and/or displaying data.

* * * * *